US012622830B2

(12) United States Patent
Beck et al.

(10) Patent No.: US 12,622,830 B2
(45) Date of Patent: May 12, 2026

(54) SYSTEM, DEVICE, AND METHOD FOR TURNING AND POSITIONING A PATIENT

(71) Applicant: Sage Products, LLC, Cary, IL (US)

(72) Inventors: David P. Beck, Cary, IL (US); Kristin Marie Sexton, Lake in the Hills, IL (US); Adam Cole, Cary, IL (US); Dan Ulreich, Cary, IL (US)

(73) Assignee: Sage Products, LLC, Cary, IL (US)

( * ) Notice: Subject to any disclaimer, the term of this patent is extended or adjusted under 35 U.S.C. 154(b) by 137 days.

(21) Appl. No.: 18/582,504

(22) Filed: Feb. 20, 2024

(65) Prior Publication Data

US 2024/0277541 A1 Aug. 22, 2024

Related U.S. Application Data

(60) Provisional application No. 63/447,185, filed on Feb. 21, 2023.

(51) Int. Cl.
*A61G 7/00* (2006.01)
*A61G 7/10* (2006.01)

(52) U.S. Cl.
CPC ........... *A61G 7/001* (2013.01); *A61G 7/1026* (2013.01); *A61G 2200/327* (2013.01)

(58) Field of Classification Search
CPC ..... A61G 7/001; A61G 7/1026; A61G 7/1023
USPC .......................................................... 5/811 T
See application file for complete search history.

(56) References Cited

U.S. PATENT DOCUMENTS

| | | | | |
|---|---|---|---|---|
| 4,675,925 | A | 6/1987 | Littleton | |
| 5,386,604 | A * | 2/1995 | Ricketts .................. | A61G 1/01 5/413 R |
| 2002/0029417 | A1 * | 3/2002 | Walker ................ | A61G 7/1026 5/81.1 R |
| 2017/0181907 | A1 | 6/2017 | Laszczyk | |

OTHER PUBLICATIONS

International Search Report and Written Opinion for International Application No. PCT/US2024/016578, mailed Apr. 18, 2024, 12 pages.

* cited by examiner

*Primary Examiner* — David R Hare
*Assistant Examiner* — Joseane E. Tejada
(74) *Attorney, Agent, or Firm* — Foley & Lardner LLP

(57) ABSTRACT

A system for positioning a patient on a support structure having a support surface includes a sheet configured to be positioned on the support surface, the sheet comprising a first fastening element, and a roll strap comprising a top edge and a bottom edge. The roll strap further comprising at least one connection end configured to engage with a portion of the support structure to maintain the patient positioned on the sheet and the roll strap in an angled position relative to the support surface, where at least one of the top edge or the bottom edge of the roll strap comprises a second fastening element that is configured to removably couple with the first fastening element.

18 Claims, 10 Drawing Sheets

SYSTEM, DEVICE, AND METHOD FOR TURNING AND POSITIONING A PATIENT

CROSS-REFERENCE TO RELATED APPLICATION

The present application claims priority to and the benefit of U.S. Provisional Patent Application No. 63/447,185, filed on Feb. 21, 2023, the entire disclosure of which is hereby incorporated by reference herein.

TECHNICAL FIELD

The present disclosure generally relates to an apparatus, system, and method for turning and positioning a patient. More specifically, for turning and positioning a person supine on a bed using a sheet having a gripping surface, a slipping surface, an absorbent pad, and/or a roll strap for use in turning and positioning a supine person, as well as systems and methods including one or more of such apparatuses.

BACKGROUND

Nurses and other caregivers at hospitals, assisted living facilities, and other locations often care for bedridden patients that have limited or no mobility, many of whom are critically ill or injured. These immobile patients are at risk for forming pressure ulcers (e.g., bedsores). Pressure ulcers are typically formed due to one or more of several factors. For example, pressure on a patient's skin, particularly for extended periods of time and in areas where bone or cartilage protrudes close to the surface of the skin, can cause pressure ulcers. Additionally, frictional forces and shearing forces from the patient's skin rubbing or pulling against a resting surface can also cause pressure ulcers. Yet further, excessive heat and moisture can cause the skin to be more fragile and increase the risk for pressure ulcers. One area in which pressure ulcers can form is on the sacrum, because a patient lying on their back puts constant pressure on the sacrum, and sliding of the patient in a bed can also cause friction and shearing at the sacrum. Additionally, some patients need to rest with their heads inclined for pulmonary reasons, which can cause patients to slip downward in the bed and cause further friction or shearing at the sacrum and other areas. Existing devices and methods may not adequately protect against pressure ulcers in bedridden patients, particularly pressure ulcers in the sacral region.

One effective way to combat sacral pressure ulcers is frequently turning a patient, so that the patient is resting on one side or the other, and pressure is taken off of the sacrum. Pillows that are stuffed partially under the patient may be used to support the patient's body in resting on their sides. A protocol is often used for scheduled turning of bedridden patients, and dictates that patients should be turned "Q2," or every two hours, either from resting at a 30° angle on one side to a 30° angle on the other side, or from 30° on one side to 0° (e.g., supine or lying on their back) to 30° on the other side.

However, turning a patient may be difficult and time consuming, typically requiring two or more caregivers, and can result in injury to caregivers from pushing and pulling the patient's weight during such turning. As a result, ensuring compliance with turning protocols, Q2 or otherwise, is often difficult. Additionally, the pillows used in turning and supporting the patient are non-uniform and can pose difficulties in achieving consistent turning angles, as well as occasionally slipping out from underneath the patient.

Based on the foregoing, the example features described herein seek to overcome these limitations and other drawbacks of existing devices, systems, and methods, and to provide new features not heretofore available.

SUMMARY

At least one embodiment relates to a system for positioning a patient on a support structure having a support surface. The system comprising a sheet configured to be positioned on the support surface, the sheet comprising a first fastening element and a roll strap. The roll strap comprising a top edge, a bottom edge, and at least one connection end configured to engage with a portion of the support structure to maintain the patient positioned on the sheet and the roll strap in an angled position relative to the support surface, where at least one of the top edge or the bottom edge of the roll strap comprises a second fastening element that is configured to removably couple with the first fastening element.

At least one embodiment relates to a roll strap for positioning a patient on a support structure having a support surface. The roll strap comprising an elongated sheet of material configured to be positioned under a portion of the patient, and at least one connection end configured to engage with a portion of the support structure to maintain the patient in an angled position relative to the support surface.

At least one embodiment relates to a method for positioning a patient on a support structure having a support surface. The method comprising placing a sheet on the support structure under a patient, the sheet comprising a first fastening element, and fastening a roll strap to the sheet. The roll strap comprising a top edge, a bottom edge, and at least one connection end configured to engage with a portion of the support structure, where at least one of the top edge or the bottom edge comprises a second fastening element that is configured to removably couple with the first fastening element. The method further comprising pulling a first connection end of the at least one connection end in a direction towards an opposing side of the support structure, moving the patient from a first position to an angled position relative to the support surface, and engaging the first connection end with the portion of the support structure to maintain the patient positioned on the sheet and the roll strap in the angled position.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE DRAWINGS

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

Referring generally to FIGS. 1-10, the various example features described herein relate to one or more systems, apparatuses or devices, and methods for turning or positioning a patient. The system may include a sheet having a high friction or gripping surface and a low friction or slipping surface, one or more support roll straps configured to selectively (e.g., removably) couple to the sheet to support the patient at an angled or side-laying position, and an absorbent body pad configured to be placed over the sheet. The example features of the system, devices, and methods of the present disclosure are described below.

Referring to FIGS. 1-4, a system 100 for use in turning and positioning a person is shown, according to some embodiments. For example, the system 100 may be used in turning and positioning a person from a supine position, such as lying flat on a support structure (e.g., a hospital bed) having a support surface (e.g., a mattress), to an angled position. For example, the patient may be turned onto their side such that their body is at an angle with respect to a horizontal plane (e.g., the bed).

Figure 1:
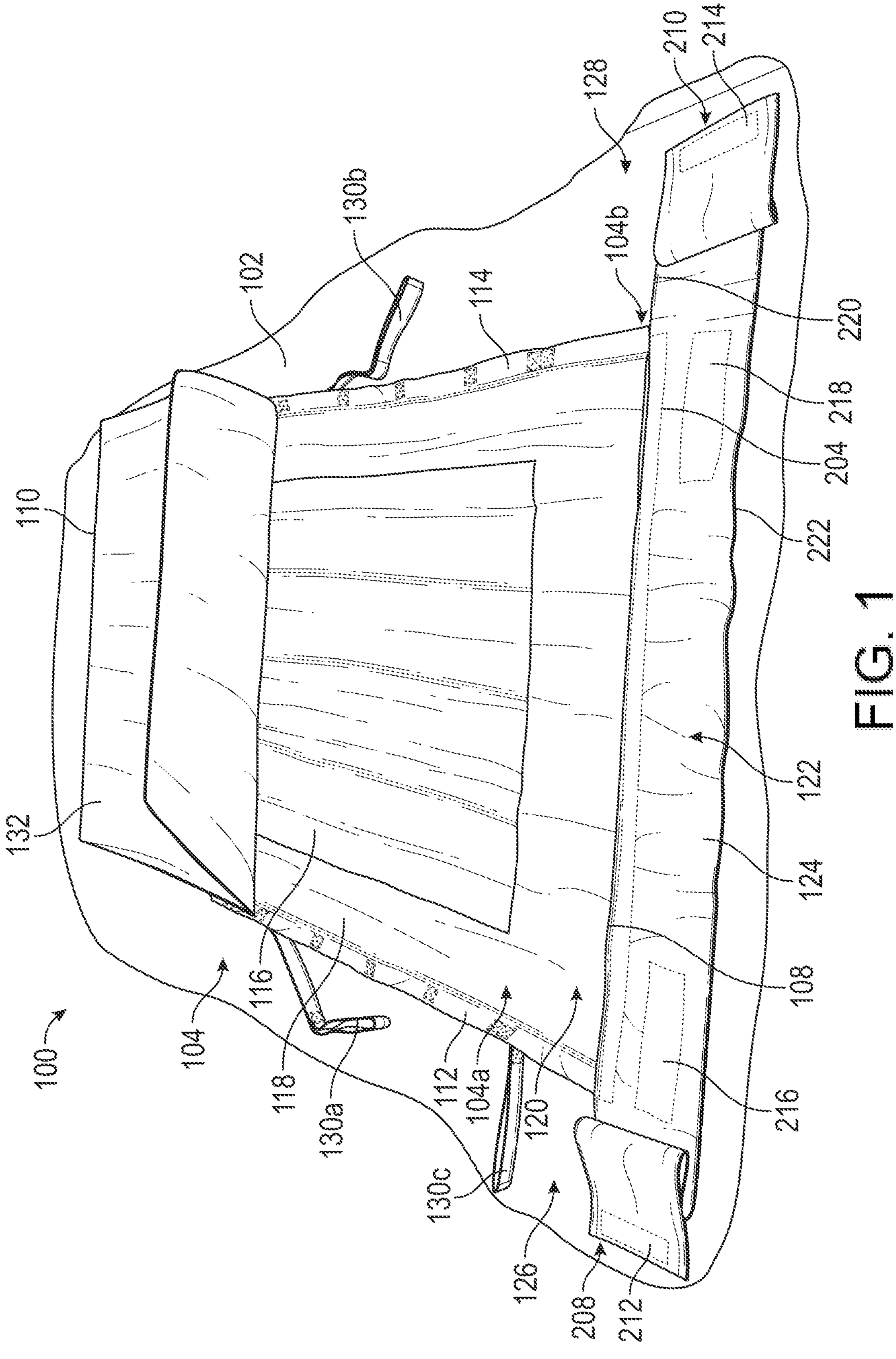
FIG. 1 is a perspective view of a system for turning and positioning a patient, according to an example embodiment.

As shown in FIG. 1, according to some embodiments the system 100 is positioned on top of a support structure 102. For example, the support structure 102 may be a hospital bed, an examination table, a stretcher, or any other surface a patient may be lying down on. The support structure 102 may be supported by a frame 105 and include a mattress 106 (shown in FIGS. 3-4). In some embodiments, the mattress 106 is breathable or incorporates air flow technology to dry moisture and provide a cool and comfortable environment to the patient. Furthermore, the mattress 106 may incorporate air pressure support, alternating air pressure support, and/or low-air-loss (LAL) technology. These technologies can utilize a pump motor or motors (not shown) to effectuate airflow into, over and/or through the mattress. The air can aid in supporting a patient (e.g., keep mattress from compressing too much), and ensure the top of the mattress may be breathable so that the airflow can pull heat and moisture vapor away from the patient.

Referring still to FIG. 1, the system 100 includes a sheet 104. The sheet 104 may be flexible and/or foldable. The sheet 104 may be configured to be positioned on the support structure 102 such that the bottom surface **104*b* is above the support structure 102 and the sheet 104 is supported by the support structure 102 (as shown in at least FIGS. 3-4). The sheet 104 may be configured to be positioned beneath a patient, for example such that the sheet 104 supports one or more anatomical features of the patient (e.g., legs, torso, back, shoulders, neck, head, arms, hands, etc.). The sheet 104 may be generally rectangular in shape, and have four peripheral edges (as shown in at least FIGS. 1-2). In some embodiments, the sheet 104** is another suitable shape or configuration, for example having another suitable number of peripheral edges (e.g., one, three, five, etc.).

Furthermore, the sheet 104 includes a top surface **104*a*, a bottom surface 104*b*, a top edge 108, a bottom edge 110, a first lateral edge 112, and a second lateral edge 114. The bottom edge 110 is positioned opposite of the top edge 108. The top edge 108 and the bottom edge 110 may be substantially equal in length. The second lateral edge 114 is positioned opposite of the first lateral edge 112. The first lateral edge 112 and the second lateral edge 114 may be substantially equal in length. According to some embodiments, the top edge 108 and the bottom edge 110 may be shorter in length than the first lateral edge 112 and the second lateral edge 114**.

The sheet 104 may further include a first sheet portion 116 and a second sheet portion 118, which together form the top surface **104*a* of the sheet. The first sheet portion 116 may be smaller than the second sheet portion 118. For example, the first sheet portion 116 may be positioned on top of the second sheet portion 118 such that an outer border 120 of the second sheet portion 118 is formed around the first sheet portion 116. The first sheet portion 116 may be centered on the second sheet portion 118. For example, the first sheet portion 116 may be positioned such that the majority of the patient's body is on top of both the first sheet portion 116 and the second sheet portion 118 to reinforce the sheet 104**.

The first sheet portion 116 may be formed of a high-friction or gripping material. The second sheet portion 118 may be formed of a low-friction or sliding material. In some embodiments, the first sheet portion 116 and/or the second sheet portion 118 are formed by multiple components. For example, the first sheet portion 116 (e.g., high-friction or gripping material) may be formed of a plurality of strips or patches of high-friction material connected on the top surface **104*a*. Similarly, the second sheet portion 118 (e.g., low-friction or sliding material) may be formed of a plurality of strips or patches of low-friction material connected to the top surface 104*a*. In some embodiments, the bottom surface 104*b* has at least a first bottom portion 134 (not shown) and a second bottom portion 136 (not shown). Similar to the top surface 104*a*, the first bottom portion 134 and/or the second bottom portion 136 of the bottom surface 104*b*** may be formed of at least one piece of high-friction and/or low-friction material.

According to some embodiments, the high friction material is a warp knit tricot material that may be brushed, napped, and/or sanded to raise its pile, which can enhance comfort, and may be made of polyester and/or another suitable material. The high-friction material can then be treated with a high friction substance, such as a hot melt adhesive or appropriate plastic, which can be applied as a discontinuous coating to promote breathability. The high friction material can also be treated with a water repellant, such as PTFE. In some embodiments, the high-friction material may include any combination of these components, and may contain other components in addition to or instead of these components.

Generally, the high friction material has a coefficient of friction that is higher than the coefficient of friction of the low friction material. In some embodiments, the coefficient of friction for the high friction material is about 8-10 times higher than the coefficient of friction of the low friction material. In some embodiments, the coefficient of friction for the high friction material is between 5 and 10 times higher, or at least 5 times higher, than the coefficient of friction of the low friction material. The coefficient of friction, as defined herein, can be measured as a direct proportion to the pull force necessary to move either of the materials in surface-to-surface contact with the same third material, with the same normal force loading. Thus, in some embodiments, if the pull force for the high friction material is about 8-10 times greater than the pull force for the low friction material, with the same contact material and normal loading, the coefficients of friction will also be 8-10 times different.

It is understood that the coefficient of friction may vary by the direction of the pull force, and that the coefficient of friction measured may be measured in a single direction. For example, in some embodiments, the above differentials in the coefficients of friction of the high friction material and the low friction material may be measured as the coefficient of friction of the low friction material based on a pull force normal to the lateral edges and the coefficient of friction of the high friction material based on a pull force normal to the top edge 108 and bottom edge 110 (i.e. parallel to the lateral edges 112 and 114).

Furthermore, the first sheet portion 116 is coupled to the second sheet portion 118. For example, the first sheet portion 116 may be stitched (e.g., sewn), coupled via adhesive, coupled via heat treatment, or coupled via welding to the second sheet portion 118. For example, the first sheet portion 116 and the second sheet portion 118 may be coupled such that when force is applied to the second sheet portion 118, the first sheet portion 116 is not separated from the second sheet portion 118.

According to some embodiments, the sheet 104 further includes a plurality of handles 130. The plurality of handles 130 may be positioned on the first lateral edge 112 and the second lateral edge 114. For example, a first handle **130*a* may be positioned on the first lateral edge 112, and a second handle 130*b* may be positioned on the second lateral edge 114 opposite of the first handle 130*a*. Furthermore, according to some embodiments, the system 100 includes a third handle 130*c* positioned on the first lateral edge 112. The plurality of handles 130 may be configured to be used to adjust the position of the patient by adjusting the sheet 104. For example, the plurality of handles 130 may be used to rotate the patient from a supine position to a side lying position such that their body is at an angle relative to the support structure 102**.

The plurality of handles 130 may be formed of one or more strips of resilient material (e.g., nylon, etc.). The plurality of handles 130 may be spaced along one or more peripheral edges of the sheet 104 (as shown in at least FIGS. 1-3). For example, the plurality of handles 130 may be evenly spaced along opposing peripheral edges (e.g., the first lateral edge 112 and the second lateral edge 114), such that opposing handles 130 are aligned laterally across the sheet 104. In some embodiments, the opposing handles 130 are spaced along opposing peripheral edges, such that the opposing handles 130 are offset laterally across the sheet 104. For example, the second handle **130*b* may be longitudinally positioned between the opposing first handle 130*a* and the third handle 130*c*. According to some embodiments, the handles 130 are coupled with the bottom surface 104*b* of the sheet 104. However, in some embodiments the plurality of handles 130 are positioned at other portions of the sheet 104 (e.g., a top edge 108, a bottom edge 110, etc.), otherwise spaced along the sheet 104 (e.g., staggered, unevenly spaced, etc.), and/or otherwise coupled to the sheet 104 (e.g., at the top surface 104*a***).

The system 100 may further include a body pad, an absorbent body pad, or an absorbent pad, shown as absorbent pad 132. The absorbent pad is positioned on top of the sheet 104 and under the patient. The absorbent pad 132 is configured to absorb (e.g., soak up, retain, etc.) any waste or moisture (e.g., fluids generated by a patient). In some embodiments, the absorbent pad 132 is a low-lint pad, for example to reduce risk of wound contamination, and/or is disposable or replaceable (e.g., when soiled). A top and a bottom surface of the absorbent pad 132 may have the same or different coefficients of friction. The absorbent pad 132 is disposable such that a health care provider can easily remove the absorbent pad 132 and replace it with a fresh one. Replacing the absorbent pad 132 helps maintain a sanitary environment for the patient.

Furthermore, the coefficient of friction of the interface between the high-friction material and the absorbent pad 132 is greater than the coefficient of friction of the interface between the low friction material and the sheet 104 or the support structure 102. It is understood that the coefficients of friction for the interfaces may also be measured in a directional orientation, as described above. It is also understood that the coefficient of friction for the interface could be modified to at least some degree by modifying factors other than the sheet 104. For example, a high-friction substance or surface treatment may be applied to the bottom surface of the absorbent pad 132, to increase the coefficient of friction of the interface.

The system 100 further includes a roll strap 122. The roll strap 122 is removably (e.g., selectively) coupled to the sheet 104. In some embodiments, the roll strap 122 is formed of a first sheet and a second layer of material (not shown). The first layer and the second layer may be connected via stitching. In some embodiments, the first layer and the second layer form the roll strap 122 via another suitable connection, for example adhesives, sonic welding, heat welding and/or another suitable technique. In some embodiments, the roll strap 122 is formed of a single layer. The roll strap 122 may be flexible and/or foldable. In some embodiments, the roll strap 122 is formed of a suitably resilient material (e.g., nylon, etc.).

Figure 2:
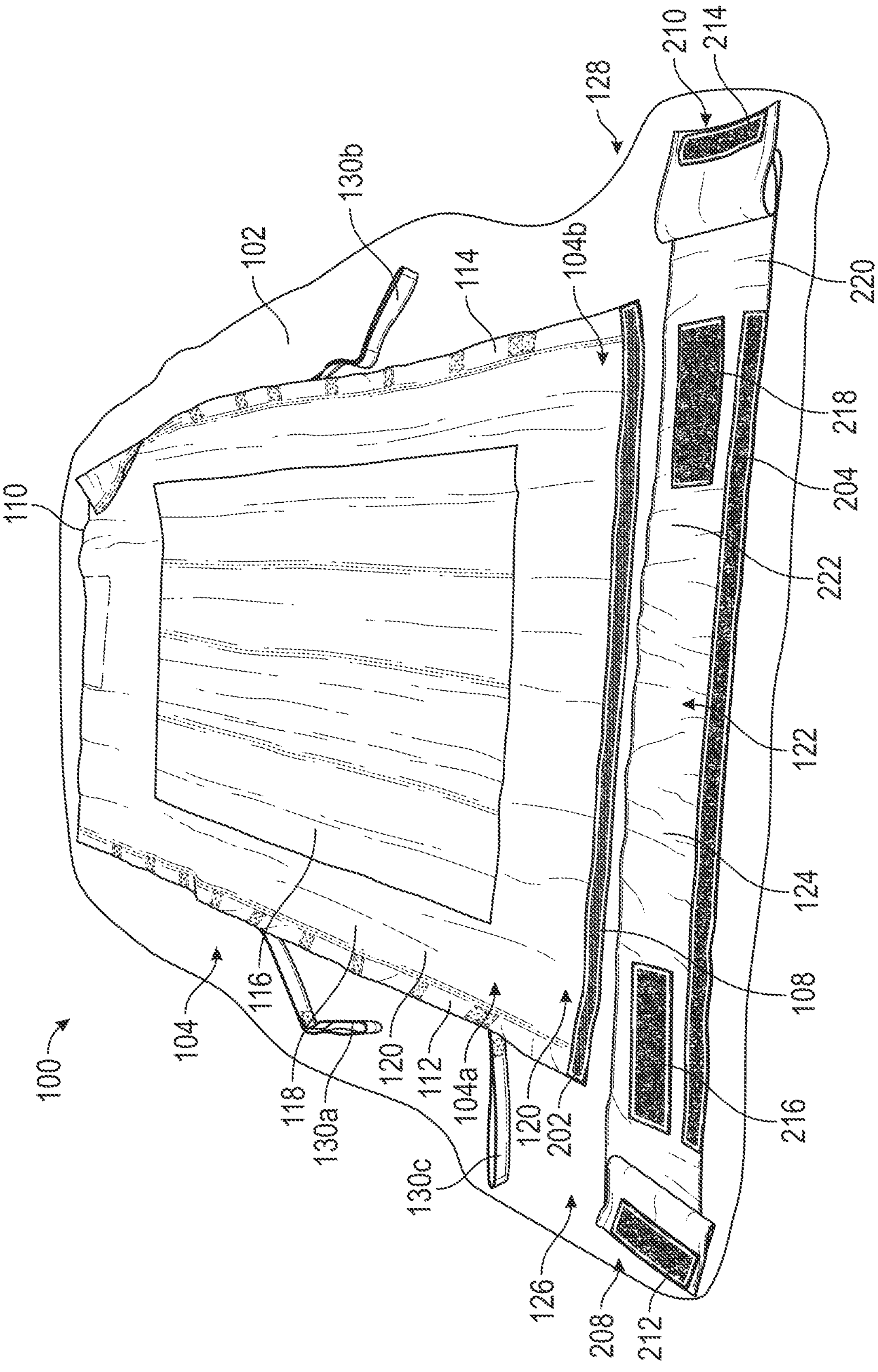
FIG. 2 is a perspective view of a sheet and a roll strap of the system of FIG. 1 with the roll strap removed from the sheet, according to an example embodiment.

As shown in at least FIGS. 1-2, according to some embodiments the roll strap 122 is generally rectangular in shape, and includes four peripheral edges. In some embodiments, the roll strap 122 is another suitable shape or configuration (e.g., square, rectangular having chambered edges, oval, etc.), for example having another number of peripheral edges (e.g., one, three, five, etc.).

According to some embodiments, the roll strap 122 includes a top surface 124, a bottom surface 206 (shown in FIG. 4), and at least one connection end. According to some embodiments, the roll strap 122 includes both a first connection end 126 and a second connection end 128, though it is contemplated that only one end of the roll strap 122 be configured as a connection end as described herein. The first connection end 126 is opposite of the second connection end 128. The roll strap 122 has a width (the greater dimension of the roll strap 122) that is greater than the width of the sheet 104 at the top edge 108, such that the first connection end 126 and the second connection end 128 extend beyond the lateral edges 112, 114 of the sheet. The roll strap 122 is configured to be removably secured to the sheet 104. Furthermore, the roll strap 122 is configured to secure to a portion of the support structure 102 via the first connection end 126 or the second connection end 128.

As shown in FIG. 2, the roll strap 122 further includes a first lateral edge 208, a second lateral edge 210, a first lateral edge connector 212 and a second lateral edge connector 214. The first lateral edge 208 and the first lateral edge connector 212 are located at the first connection end 126. The second lateral edge 210 and the second lateral edge connector 214 are located at the second connection end 128. The first connection end 126 further includes a first lateral edge attachment 216, and the second connection end 128 further includes a second lateral edge attachment 218. The first lateral edge attachment 216 is spaced apart from the first lateral edge 208 and the first lateral edge connector 212. The second lateral edge attachment 218 is spaced apart from the second lateral edge 210 and the second lateral edge connector 214. According to some embodiments, the first lateral edge connector 212, the first lateral edge attachment 216, the second lateral edge connector 214, and the second lateral edge attachment 218 are positioned on the same surface of the roll strap 122 (e.g., on the top surface 124). The first lateral edge connector 212 and the second lateral edge connector 214 are configured to couple with the first lateral edge attachment 216 and the second lateral edge attachment 218, respectively. For example, the first connection end 126 may be wrapped around an anchor or a portion of the support structure 102 (e.g., a railing) and the first lateral edge connector 212 coupled to the first lateral edge attachment 216. For example, rolling the patient using the roll strap 122, wrapping the first connection end 126 around a portion of the support structure 102, and then securing the first lateral edge connector 212 to the first lateral edge attachment 216 holds the patient in a side lying position such that the health care provider may perform a care routine or protocol such as examining the patient's back or removing an absorbent pad 132.

According to some embodiments, the first lateral edge connector 212 and/or the second lateral edge connector 214 are formed of fastening components that are complementary with the first lateral edge attachment 216 and the second lateral edge attachment 218 (e.g., a loop material and a hook material of a hook/loop fastener or connector, etc.). For example, the first lateral edge connector 212 and second lateral edge connector 214 may be formed of a loop material, and the first lateral edge attachment 216 and the second lateral edge attachment 218 may be formed of a hook material. As will be discussed in greater detail below, the first lateral edge connector 212, the second lateral edge connector 214, the first lateral edge attachment 216, and the second lateral edge attachment 218 may be configured to facilitate selectively coupling the roll strap 122 to itself (e.g., the first lateral edge connector 212 to the first lateral edge attachment 216, the second lateral edge connector 214 to the second lateral edge attachment 218, etc.), so as to stabilize or position a patient.

Figure 3:
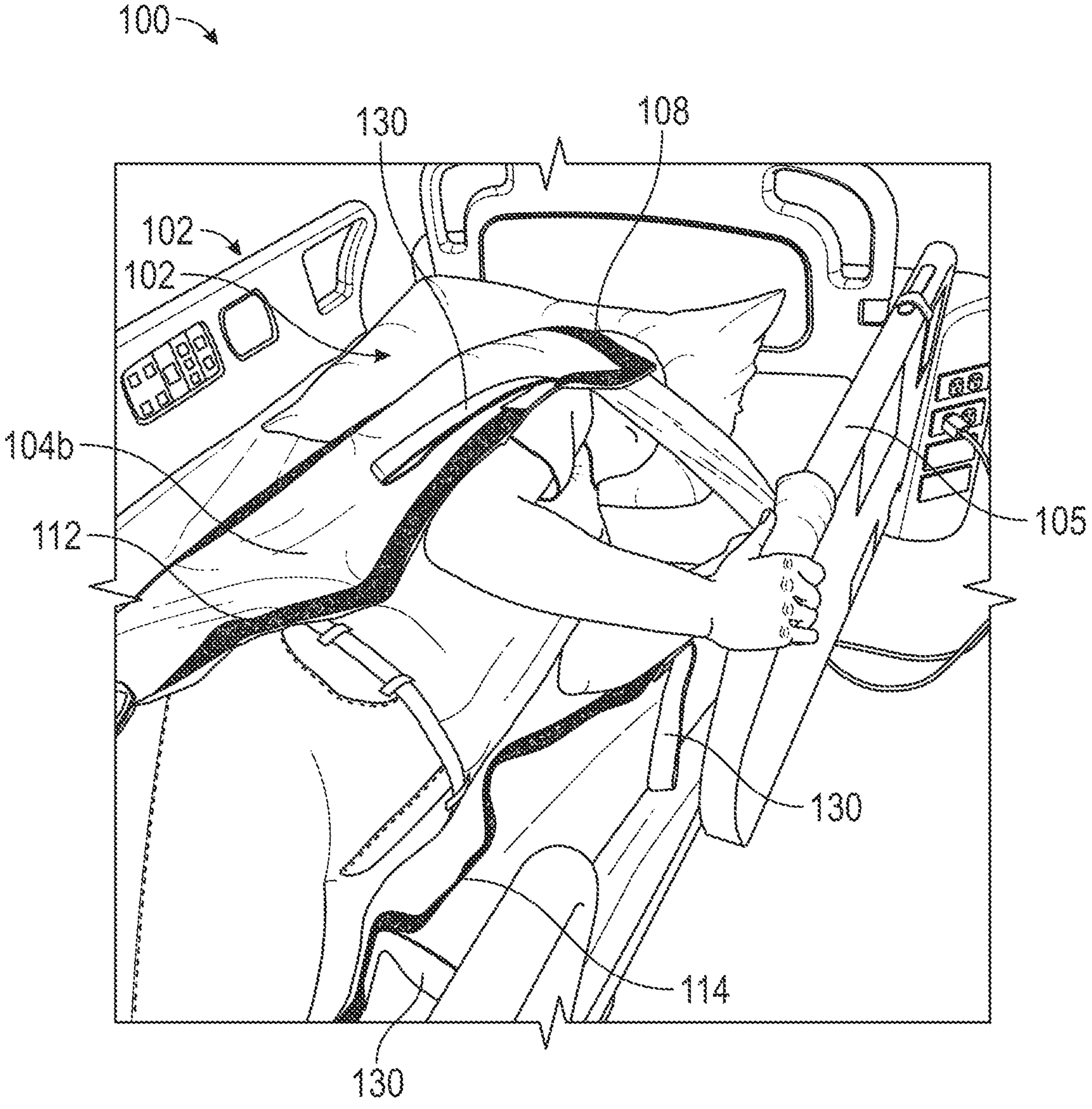
FIG. 3 is a left perspective view of the system of FIG. 1 in use with a patient, according to an example embodiment.
Figure 4:
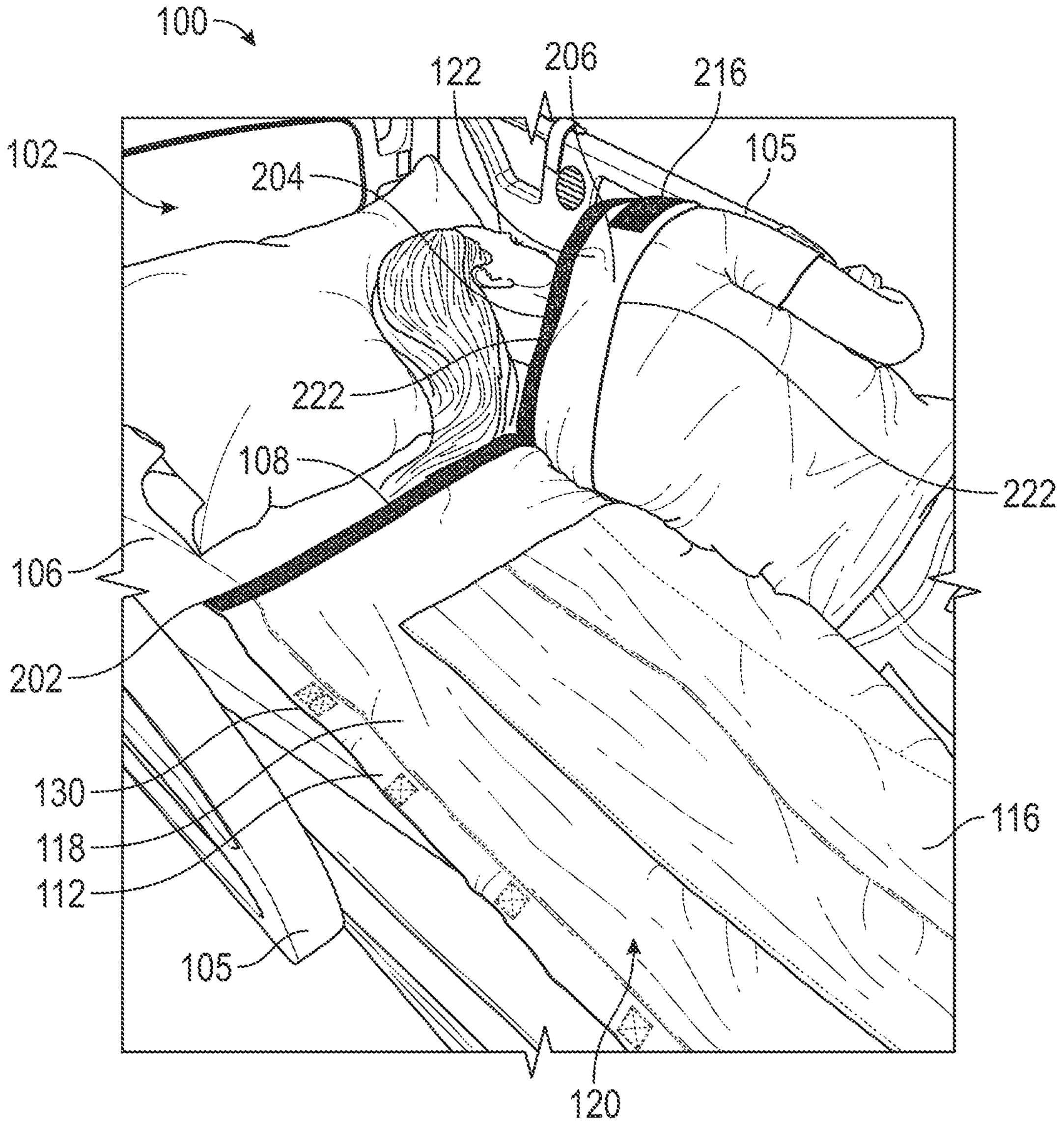
FIG. 4 is a right perspective view of the system of FIG. 1 in use with a patient, according to an example embodiment.

As shown in FIGS. 1-2, the first lateral edge connector 212 and the second lateral edge connector 214 may be located at a peripheral edge of the roll strap 122. For example, the first lateral edge connector 212 may be located proximate to the first lateral edge 208 of the roll strap 122. Further, the second lateral edge connector 214 may be located proximate to the second lateral edge 210. According to some embodiments, the connectors (e.g., the first lateral edge connector 212 and the second lateral edge connector 214) and the lateral edge attachment (e.g., the first lateral edge attachment 216 and the second lateral edge attachment 218) are spaced a distance apart (e.g., 2, 3, 5, 6, 12, inches). In this regard, the positioning and spacing of the connectors and counter-part connectors (e.g., spaced a distance apart), facilitate positioning the roll strap 122 to engage one or more anchors or portions of the support structure (e.g., loop under a rail, a post, etc.) and couple the roll strap 122 to itself, as depicted in FIGS. 3 and 4.

According to some embodiments, the manipulation of the roll strap 122 and/or engagement of the first lateral edge connector 212 and/or the second lateral edge connector 214 are configured to facilitate turning, positioning, and/or stabilizing a patient. For example, the first connection end 126 of the roll strap 122 (e.g., engagement of the first lateral edge connector 212 with first lateral edge attachment 216) is used to position a patient in a side-lying position on one side of the body, and the second connection end 128 of the roll strap (e.g., engagement of the second lateral edge connector 214 with second lateral edge attachment 218) is used to position a patient in a side-lying position on one side of the body. According to some embodiments, the first connection end 126 of the roll strap 122 would extend from under the right side of a patient's body and would secure the patient laying on their left side. In other words, the outer end of the roll strap 122 is moved over the patient's body to attach to the portion of the support system on the opposite side of the patient's body.

As described above, the sheet 104 and the roll strap 122 are configured to be removably coupled. Accordingly, as shown in FIG. 2, the system 100 includes a first fastening element, such as elongated receiving connection strip 202 on the sheet 104 and a second fastening element that is complimentary to the first fastening element, such as elongated attachment connection strip 204 on the roll strap 122. The first fastening element is configured to removably couple with the second fastening element. According to some embodiments, the receiving connection strip 202 is positioned along the top edge 108 of the sheet 104. The attachment connection strip 204 is positioned along an edge, such as the top edge 220 or bottom edge 222 of the roll strap 122. The receiving connection strip 202 is configured to receive the attachment connection strip 204 to couple the sheet 104 to the roll strap 122. The receiving connection strip 202 and the attachment connection strip 204 may be a hook and loop fastening system or another complex that is easily coupled and uncoupled repeatedly. It may be advantageous to remove the roll strap 122 from the sheet 104 so that the roll strap 122 or the sheet 104 may be replaced. In one configuration, the sheet 104 and the roll strap 122 are coupled such that the roll strap 122 extends from the peripheral edge of the sheet 104, as shown in FIG. 1. In an alternative configuration, the sheet 104 and the roll strap 122 are coupled such that the roll strap 122 overlaps with the sheet 104 (as shown in FIGS. 3 and 4). Either configuration is possible by way of re-orienting the roll strap 122 before coupling with the sheet 104.

According to some embodiments, the receiving connection strip 202 may include a loop material or a hook material (e.g., of a hook/loop fastener), an adhesive material, or another suitable fastening material. The receiving connection strip 202 may be configured to selectively (e.g., removably) couple one or more components of the system 100 (e.g., the roll strap 122), as described below.

According to some embodiments, the receiving connection strip 202 is located at a peripheral edge of the sheet 104. In the embodiment shown, the receiving connection strip 202 may be located at the top edge 220 (e.g., at a head or top portion) of the sheet 104. The receiving connection strip 202 may extend between two or more peripheral edges of the sheet 104. For example, the receiving connection strip 202 may extend between the first lateral edge 208 and the second lateral edge 210 of the sheet 104 (as shown in at least FIG. 2). The receiving connection strip 202 may be coupled with the top surface 104*a* of the sheet 104.

In some embodiments, the receiving connection strip 202 is positioned at another location of the sheet 104. For example, the receiving connection strip 202 may be positioned at the first lateral edge 208, the second lateral edge 210, the bottom edge 222, or another suitable location of the sheet 104. Further, the receiving connection strip 202 may extend between other portions of the sheet 104. For example, the receiving connection strip 202 may extend from a center portion to the first lateral edge 208, between the first lateral edge 208 and second lateral edge 210 across the center of the sheet 104, from a center portion to the second lateral edge 210, from a center portion to the top edge 220, or between other portions of the sheet 104.

In some embodiments, the receiving connection strip 202 is formed of a plurality of portions or sections. For example, the receiving connection strip 202 may be formed of a plurality of receiving connection strips (e.g., two, three, four, etc.) spaced along an edge or portion of the sheet 104. As will be discussed in greater detail below, the receiving connection strip 202 may be configured to selectively couple a counterpart connection strip of the roll strap 122, for example to facilitate turning and positioning a patient.

In some embodiments, the attachment connection strip 204 is positioned at another location of the roll strap 122. For example, the attachment connection strip 204 may be positioned at a central portion of the roll strap 122 (e.g., between the top edge 220 and the bottom edge 222, etc.), at the top edge 220, or at another suitable location of the roll strap 122. Further, attachment connection strip 204 may extend between other portions of the roll strap 122. For example, the attachment connection strip 204 may extend from a center portion of the roll strap 122 toward the first lateral edge 208 and/or the second lateral edge 210, from the top edge 220 toward the bottom edge 222, or between other portions of the roll strap 122. In some embodiments, attachment connection strip 204 is formed of a plurality of portions or sections. For example, the attachment connection strip 204 may be formed of a plurality of connection strips (e.g., two, three, four, etc.) spaced along an edge or portion of the roll strap 122. As discussed briefly above, and as will be discussed in greater detail below, the attachment connection strip 204 may be configured to selectively (e.g., removably) couple the receiving connection strip 202 of the sheet 104, for example to facilitate turning and positioning a patient.

Furthermore, according to some embodiments, the roll strap 122 may be removably coupled to another portion of the support structure (e.g. the mattress, the sheets, etc.) For example, the roll strap 122 may be removably coupled to the mattress or the sheets (not shown) such that the roll strap 122 does not tangle around the patient. This may be advantageous to keep the roll strap 122 from being displaced or removed from underneath the patient, such as in patients that require frequent rotation to prevent ulcers.

Referring generally to FIGS. 1-4, a process of using the system 100 is shown, according to some embodiments. The process generally described in FIGS. 1-4 may utilize components of the system 100 described above.

Referring to FIG. 1, the system 100 is shown, according to some embodiments. As shown in FIG. 1, the sheet 104 is coupled with the roll strap 122. According to some embodiments, the sheet 104 is coupled with the roll strap 122 via coupling of the receiving connection strip 202 and the attachment connection strip 204. In some embodiments, the sheet 104 and the roll strap 122 are positioned on a support structure 102 (e.g., a hospital bed). Further, with the sheet and the roll strap 122 positioned on the support structure 102, a patient may be positioned on top of the sheet 104 and the roll strap 122. For example, a patient may be positioned on top of the sheet 104 and the roll strap 122 in a supine position (e.g., on their back). The patient may be positioned on top of the sheet 104 (e.g., the top surface 104*a*), for example to stabilize or position the patient via the first sheet portion 116 (e.g., the high-friction portion). According to some embodiments, the sheet 104 and the roll strap 122 are configured to support one or more anatomical features of the patient. For example, the sheet 104 may be configured to support a patient's legs, torso, back, shoulders, or neck. Further, the roll strap 122 may be configured to support a patient's back, shoulders, neck, and/or head.

Referring to FIG. 3, the system 100 is shown in use, according to some embodiments. With the sheet 104 coupled with the roll strap 122 (e.g., via the receiving connection strip 202 and the attachment connection strip 204) and positioned on the support structure 102, the patient may be positioned on the sheet 104 and the roll strap 122 in a supine position, as discussed above. The patient may then be repositioned (e.g., turned, rolled, angled, etc.), for example via pulling or repositioning one or more of the handles 130. In some embodiments, the patient is repositioned (e.g., turned, rolled, angled, etc.) via pulling or repositioning at least one of the peripheral edges of the sheet 104 (e.g., the first lateral edge 208, etc.) and/or the roll strap 122 (e.g., the first lateral edge 208). With the patient repositioned (e.g., turned, rolled, angled, etc.), the patient may be supported or stabilized, for example by coupling the roll strap 122 to itself, for example, using the lateral edge connectors 212, 214 and lateral edge attachments 216, 218 (as shown in at least FIG. 3).

In FIG. 3, the first lateral edge 208 of the roll strap 122 is repositioned in a first direction toward an anchor (e.g., a portion of the support structure 102, the frame 105 or rail thereof). For example, the first the first lateral edge 208 of the roll strap 122 may be moved in a first direction (e.g., over the patient, toward an anchor) to engage the anchor, e.g., frame 105. For example, and as shown in FIG. 3, the first lateral edge 208 of the roll strap 122 may be repositioned to loop around (e.g., under, loop over, etc.) an external rail (e.g., of the frame 105) of the support structure 102. With the first lateral edge 208 of the roll strap 122 engaged with the frame 105, a connector (e.g., the first lateral edge connector 212) of the first lateral edge 208 may couple the roll strap 122 to the frame 105. For example, with the first lateral edge 208 of the roll strap 122 engaged with the external rail of the frame 105 of the support structure 102 (e.g., looped around), the first lateral edge connector 212 may couple with the first lateral edge attachment 216 to couple the first lateral edge 208 of the roll strap 122 to the external rail of the frame 105. As shown in FIG. 3, the roll strap 122 (e.g., via the first lateral edge connector 212) may couple an anchor (e.g., external rail of the frame 105) so as to support or stabilize the patient. For example, the patient may be stabilized in a rotated positioned such that their body is at an angle with respect to the mattress.

Further, in some embodiments, a second lateral edge 210 of the roll strap 122 is repositioned so as to provide supplemental support and/or to position the patient. In some embodiments, a second portion of the roll strap 122 is repositioned in a second direction toward an anchor. For example, the second lateral edge 210 of the roll strap 122 may be repositioned in a second direction (e.g., away from the patient, in a direction substantially aligned with the first direction, etc.).

The second lateral edge 210 of the roll strap 122 may also be repositioned to engage an anchor (e.g., the frame 105, the railing of the frame 105). For example, the second lateral edge 210 of the roll strap 122 may be repositioned to loop around (e.g., loop under, loop over, etc.) an external member (e.g., rail, frame member, etc.) of the support structure 102. With the second portion of the roll strap 122 engaged with the anchor, a connector (e.g., the second lateral edge connector 214) may couple the roll strap 122 to the anchor. For example, with the second lateral edge 210 of the roll strap 122 engaged with the external anchor (e.g., looped around a rail or frame 105, etc.), the second lateral edge connector 214 may couple with the second lateral edge attachment to couple the second lateral edge 210 to the anchor. In this regard, the roll strap 122 (e.g., via the second lateral edge connector 214) may couple a second anchor (e.g., external rail or frame, etc.) so as to support or stabilize a patient. For example, the roll strap 122 may be configured to support or stabilize a first portion of a patient (e.g., a first or right shoulder, back, neck, etc. via the roll strap 122 and the first lateral edge connector 212) and a second portion of the patient (e.g., a second or left shoulder, back, neck, etc. via the roll strap 122 and the second lateral edge connector 214).

Referring to FIG. 4, the system 100 is shown in use, according to some embodiments. With the patient repositioned (e.g., turned, rolled, angled, etc.) and/or supported by the roll strap 122, as discussed above with regard to FIG. 3, in some situations it may be desirable for a healthcare provider to remove the sheet 104. For example, it may be desirable for a healthcare provider to uncouple the roll strap 122 from the sheet 104 so as to expose one or more anatomical features of the patient for cleaning or disinfecting (e.g., legs, torso, back, shoulders, etc.). In this regard, with the patient repositioned, the selective (e.g., removable) coupling between the receiving connection strip 202 and the attachment connection strip 204 may allow a healthcare provider to remove the sheet 104 while the roll strap 122 remains in use with the patient. For example, the healthcare provider may rip, cut, tear, or otherwise manipulate the sheet 104, so as to selectively de-couple the receiving connection strip 202 from the attachment connection strip 204, thereby separating the sheet 104 from the roll strap 122. As shown in FIG. 4, and according to some embodiments, with the sheet 104 separated from the roll strap 122, the roll strap 122 remains coupled with the one or more anchors to support and stabilize the patient in a turned or angled position. According to some embodiments, the system 100 further includes a wedge, and the process includes placing a wedge under the patient, and, optionally, removing the roll strap 122 from the anchor, to keep the patient in the second position.

The processes described above with regard to FIGS. 1-4 may be completed in sequence, individually, or in combination with any of the other processes described herein.

All of some of the components described in the system 100 may be provided in a kit, which may be in a pre-packaged arrangement. For example, the kit (not shown) may be pre-packaged to include all necessary components of the system 100. For example, the kit may be arranged such that portions of the kit are already assembly. This is advantageous for reducing the amount of time needed by a health care provider to set up the system 100.

According to some embodiments, the kit may include the sheet 104 and the absorbent pad 132. For example, the absorbent pad 132 may be placed on the top surface 104*a* of the sheet 104. The sheet 104 and the absorbent pad 132 may be folded together to fit into the kit. For example, the absorbent pad 132 may be in confronting relation with the top surface 104*a* and the sheet 104 may be folded such that the absorbent pad 132 is not exposed to any other components of the kit.

Furthermore, the kit may include the roll strap 122. The roll strap 122 may be already coupled to the sheet 104. For example, the receiving connection strip 202 of the sheet 104 may be coupled to the attachment connection strip 204 of the roll strap 122. The roll strap 122 may be positioned in the kit such that the roll strap 122 does not contact the absorbent pad 132. For example, the sheet 104 may be folded to encapsulate the absorbent pad 132, and the roll strap 122 may in confronting relation with the bottom surface 104*b* of the sheet 104. Furthermore, the roll strap 122 may be used to secure the folded sheet 104 and the absorbent pad 132 such that they do not come unfolded when unpacking the kit. For example, the roll strap 122 may be wrapped around the sheet 104. The first lateral edge 208 or the second lateral edge 210 may be secured to the roll strap 122 to prevent the sheet 104 from unfolding.

According to some embodiments, the kit may be vacuum-packed and/or compressed and sealed to reduce the size of the kit and keep the kit sanitary. This may be advantageous for storing multiple kits within a hospital setting (e.g., in a supply room, or in a patent room).

Referring generally to FIGS. 5-10, a roll strap 500 for use in turning and/or positioning a person is shown, according to some embodiments. In some embodiments, the roll strap 500 is the roll strap 122 of FIGS. 1-4. In some embodiments, the roll strap 500 is separate from another system or device (e.g., a sheet, a pad, a strap, etc.). In some embodiments, the roll strap 500 is configured to removably (e.g., selectively) couple another system or device (e.g., a sheet, a pad, a strap, etc.) As discussed herein, the roll strap 500 may be used in turning and/or positioning a person, for example from a supine position to an angled position, from a supine position to a sitting position, from a depressed position to an elevated position, and/or any between any other suitable positions.

Figure 5:
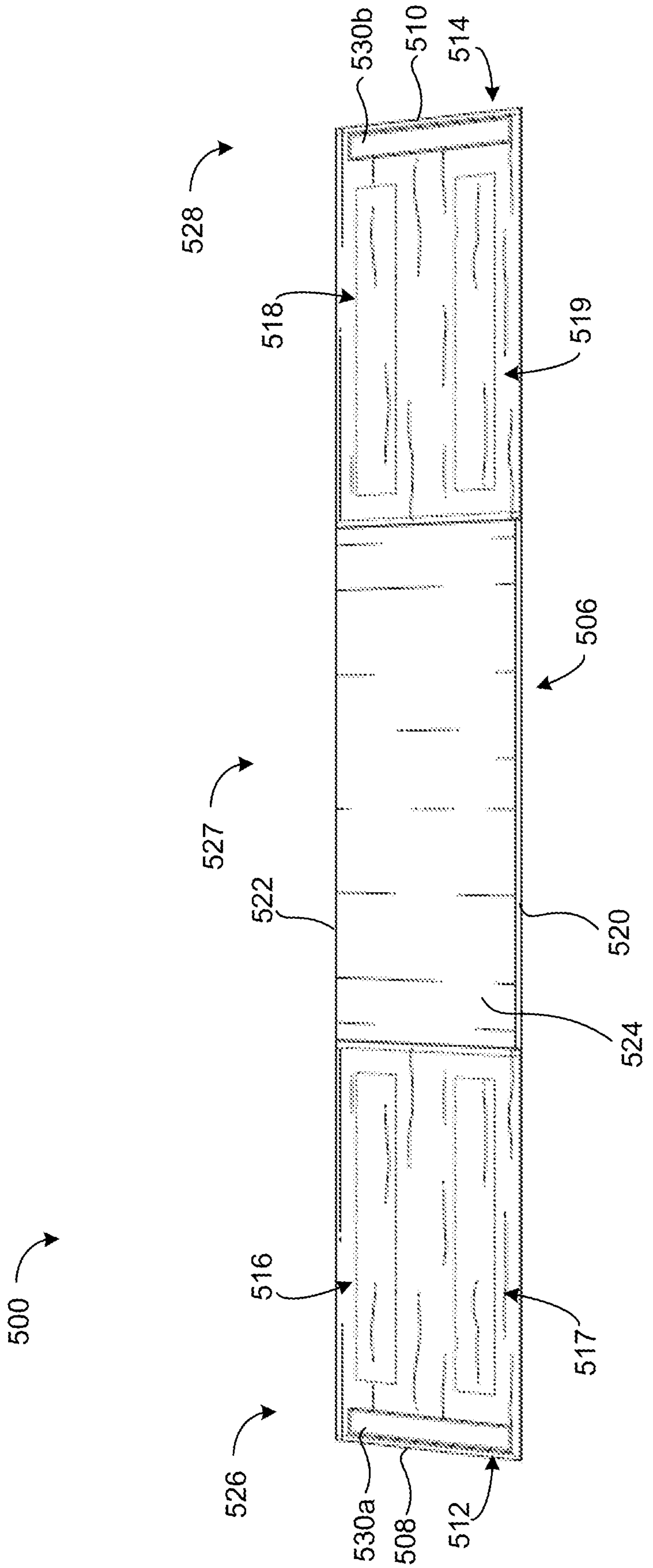
FIG. 5 is a perspective view of a roll strap, according to an example embodiment.

As shown in at least FIG. 5, the roll strap 500 is generally rectangular in shape, and includes at least one peripheral edge (e.g., four peripheral edges, etc.). In some embodiments, the roll strap 500 is another suitable shape and/or configuration (e.g., square, rectangular having chambered edges, oval, etc.), for example having another number of peripheral edges (e.g., one, three, five, etc.). The roll strap 500 may be formed of a first layer of material and a second layer of material. The first layer of material and the second layer of material may be connected via stitching. In some embodiments, the first layer of material and the second layer of material are connected via another suitable connection, for example adhesives, sonic welding, heat welding, and/or another suitable technique. In some embodiments, the roll strap 500 is formed of a single layer. The roll strap 500 may be flexible and/or foldable. In some embodiments, the roll strap 500 is formed of a suitably resilient material (e.g., nylon, etc.).

Figure 6:
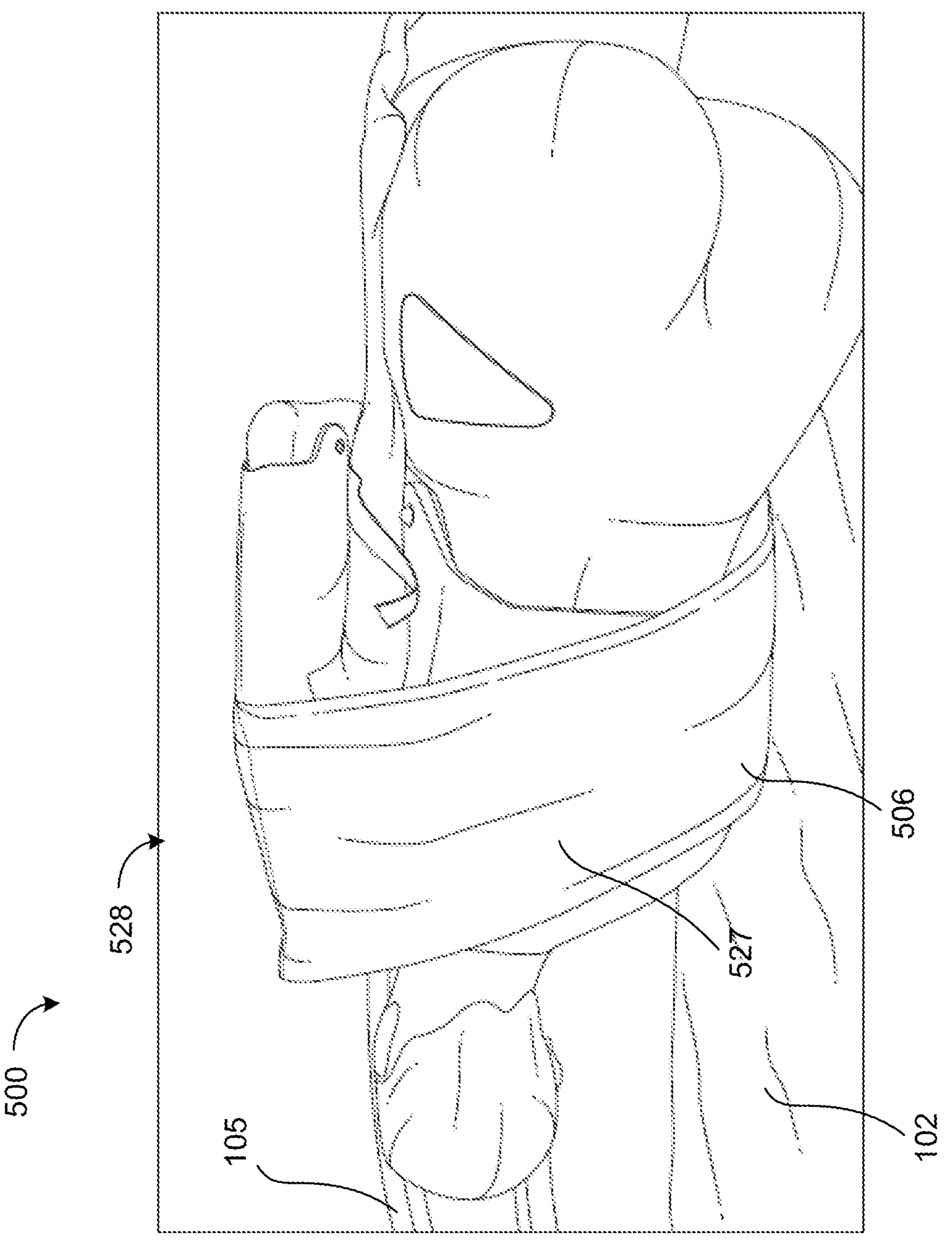
FIG. 6 is a side perspective view of the roll strap of FIG. 5 in use with a patient, according to an example embodiment.
Figure 7:
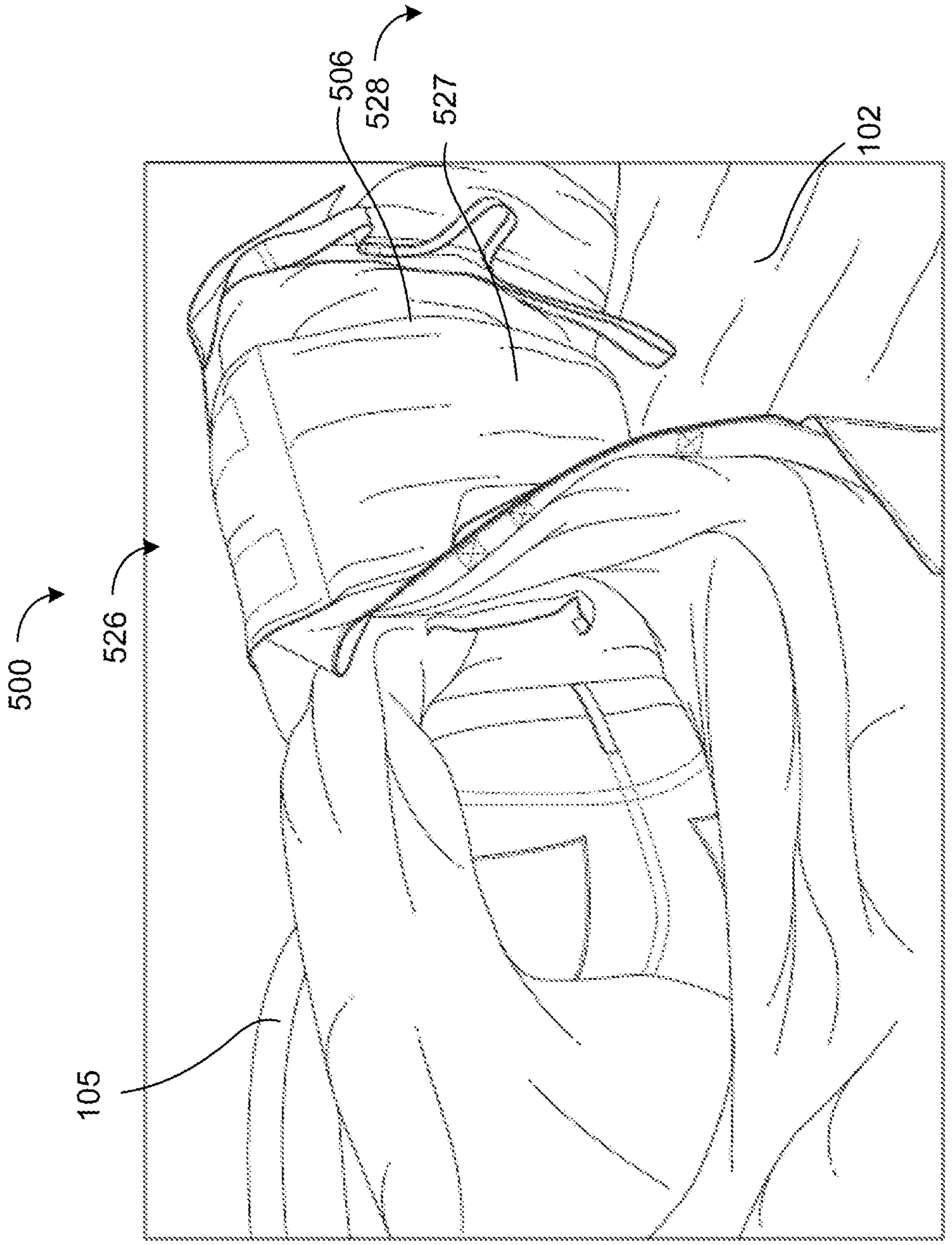
FIG. 7 is a side perspective view of the roll strap of FIG. 5 in use with a patient, according to an example embodiment.
Figure 8:
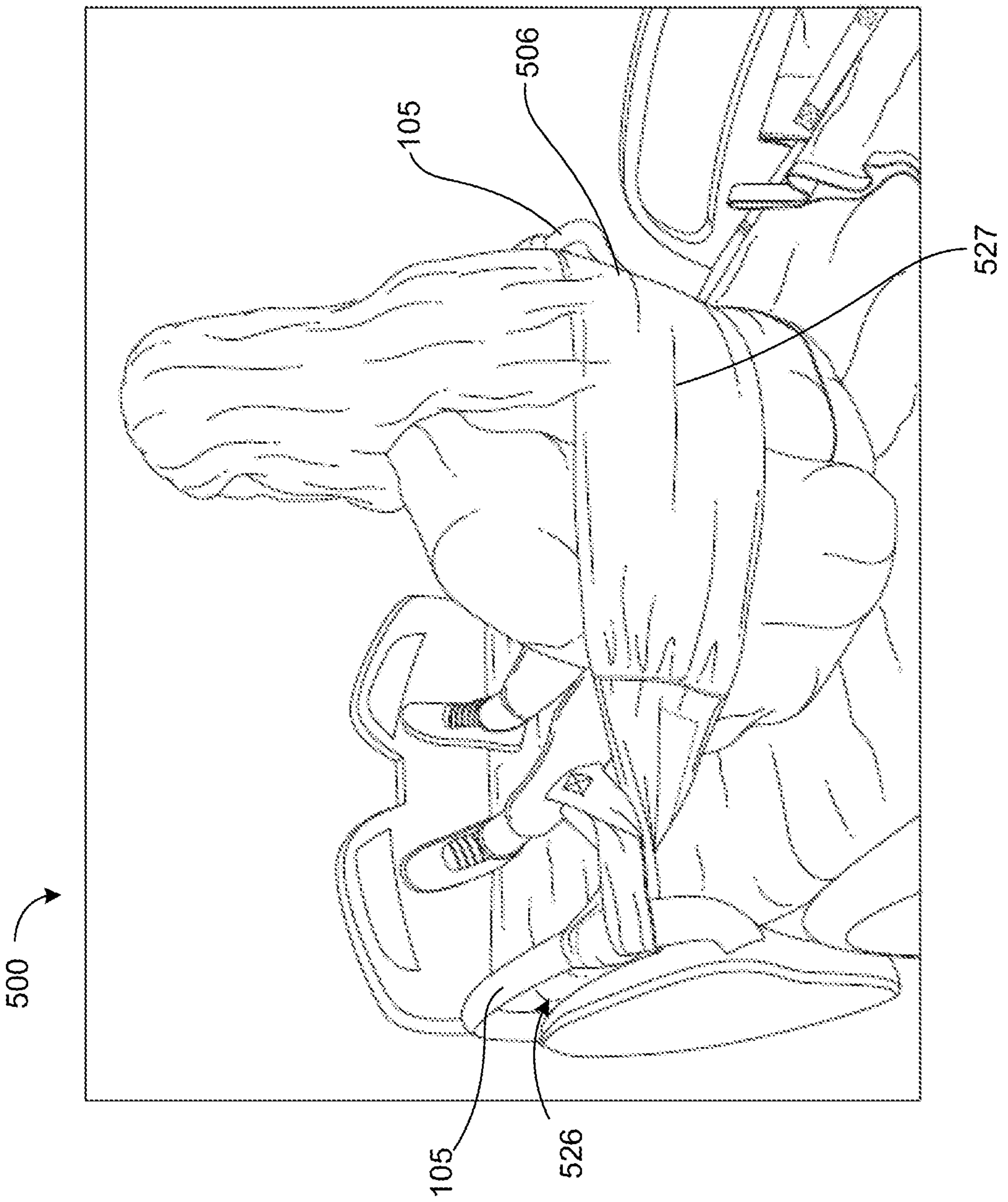
FIG. 8 is a rear perspective view of the roll strap of FIG. 5 in use with a patient, according to an example embodiment.

In some embodiments, the roll strap 500 includes a top surface 524 and a bottom surface 506 (shown in at least FIGS. 6-8). The roll strap 500 may further include at least one connection end. For example, the roll strap 500 may include a first connection end 526 and a second connection end 528. The roll strap 500 may further include a central portion 527 (e.g., middle portion, etc.). In some embodiments, the first connection end 526 is opposite the second connection end 528, and the central portion 527 is between the first connection end 526 and the second connection end 528. The roll strap 500 may be configured to secure a portion of a support structure (e.g., a rail or arm of the support structure 102, a rail or arm of the frame 105, etc.), for example via the first connection end 526 and/or the second connection end 528. It should be understood that while the roll strap 500 is described as including the first connection end 526 and the second connection end 528, it is contemplated that in some embodiments only one end of the roll strap 500 is configured as a connection end.

In some embodiments, the central portion 527 defines a predetermined amount of the roll strap 500 (e.g., one-tenth, one-eighth, one-fourth, one-third, one-half, three-fourths, etc. of the roll strap 500). In some embodiments, the central portion 527 includes a pad or foam portion. For example, the central portion 527 may include a pad (e.g., between the first layer of material and the second layer of material, between the top surface 524 and the bottom surface 506, etc.). The pad or foam portion may further define a predetermined amount of the central portion 527 (e.g., one-tenth, one-eighth, one-fourth, one-third, one-half, three-fourths, etc. of the central portion 527). The pad or foam portion may be rectangular and/or sized approximately equal to a width and/or height of the central portion 527. In some embodiments, the pad or foam portion is otherwise shaped (e.g., square, circular, oval, donut-shaped, etc.) and/or sized. In some embodiments, the pad or foam portion is coupled to the central portion 527 (e.g., coupled to the first layer of material, the top surface 524, etc.). In some embodiments, the pad or foam portion is positioned at a predetermined location at the central portion 527 (e.g., a central portion, toward one or both connection ends, etc.). In some embodiments, the central portion 527 includes a plurality of pads and/or foam portions (e.g., two, three, four, 10, 15, etc.).

As shown in FIG. 5, the roll strap 500 further includes a first lateral edge 508, a second lateral edge 510, a top edge 520, and a bottom edge 522. The first lateral edge 508, the second lateral edge 510, the top edge 520, and the bottom edge 522 may define the roll strap 500 (e.g., define a perimeter, a circumference, etc.). In some embodiments, the first lateral edge 508, the second lateral edge 510, the top edge 520, and the bottom edge 522 are sized and/or configured such that the roll strap 500 has a predetermined size and/or shape. For example, the roll strap 500 may be sized such that the roll strap 500 has a width (e.g., between the first lateral edge 508 and the second lateral edge 510) and a height (e.g., between the top edge 520 and the bottom edge 522). The width and the height of the roll strap 500 may have proportional sizes of 5:1 (e.g., 5 feet wide by 1 foot in height, etc.). In some embodiments, the roll strap 500 has a width and height that are another suitable proportion (e.g., 3:1, 4:1, 6:1, 7:2, 9:2, 11:2, 10:3, 11:3, 13:3, 14:3, 16:3, 17:3, etc.).

In some embodiments, the roll strap 500 further includes a first lateral edge connector 512 and a second lateral edge connector 514. The first lateral edge connector 512 may be located at the first connection end 526, and the second lateral edge connector 514 may be located at the second connection end 528. The first lateral edge connector 512 and/or the second lateral edge connector 514 may extend from the top edge 520 toward the bottom edge 522. As shown in FIG. 5, the first lateral edge connector 512 and/or the second lateral edge connector 514 are positioned on the same surface of the roll strap 500 (e.g., the bottom surface 506, etc.).

In some embodiments, the roll strap 500 further includes at least one edge attachment, lateral edge attachment, and/or an attachment. For example, the first connection end 526 may include a first attachment 516 and a second attachment 517. Similarly, the second connection end 528 may also include a third attachment 518 and a fourth attachment 519. As shown in FIG. 5, the first attachment 516, the second attachment 517, the third attachment 518, and/or the fourth attachment 519 are positioned on the same side or surface of the roll strap 500 compared to the first lateral edge connector 512 and/or the second lateral edge connector 514 (e.g., on the bottom surface 506, etc.). The attachments 516, 517, 518, and/or 519 may extend from the first lateral edge 508 and/or the second lateral edge 510 toward the central portion 527. In some embodiments, the first attachment 516 and/or the second attachment 517 may be spaced apart from the first lateral edge 508 and/or the first lateral edge connector 512 (e.g., toward the central portion 527). The third attachment 518 and/or the fourth attachment 519 may be spaced apart from the second lateral edge 510 and/or the second lateral edge connector 514 (e.g., toward the central portion 527). In some embodiments, the first lateral edge connector 512, the attachments 516, 517, the second lateral edge connector 514, and/or the attachments 518, 519 are positioned on the different surfaces of the roll strap 500 (e.g., the top surface 524, the bottom surface 506, etc.), and/or are otherwise positioned or configured.

In some embodiments, the first lateral edge connector 512 is configured to couple with the first attachment 516 and/or the second attachment 517. The second lateral edge connector 514 may be configured to couple with the third attachment 518 and/or the fourth attachment 519. For example, the first connection end 526 may be wrapped around an anchor or a portion of a support structure (e.g., a railing, a post of the support structure 102, etc.), such that the first lateral edge connector 512 couples to the first attachment 516 and/or the second attachment 517. The second connection end 528 may similarly be wrapped around an anchor or portion of a support structure (e.g., a railing, a post of the support structure 102, etc.), such that the second lateral edge connector 514 couples to the third attachment 518 and/or the fourth attachment 519.

As will be discussed in greater detail herein, the roll strap 500 may be used for rolling or positioning a patient, for example by wrapping the first connection end 526 around a portion of the support structure 102 (e.g., a post or railing, etc.), wrapping the roll strap 500 around the patient (e.g., the central portion 527 around a torso, abdominal, or back of a patient, etc.), and then securing the second connection end 528 to the portion of the support structure (e.g., the post or railing, etc.), thereby holding the patient in a side lying position such that a health care provider may perform a care routine or protocol such as examining a patient's back and/or removing a pad or sheet. In some embodiments, the roll strap 500 may be used for positioning a patient, for example by wrapping the first connection end 526 around a portion of the support structure 102 (e.g., a post or railing), placing a portion of the patient's anatomy on the roll strap 500 (e.g., a back of a patient, a leg of a patient, an arm of a patient), and then securing the second connection end 528 to another portion of the support structure (e.g., an opposing post or railing, etc.), thereby supporting the patient, for example in a seated or upright position and/or in a position that elevates the patient's anatomy (e.g., an arm, a leg, etc.).

According to some embodiments, the first lateral edge connector 512 is formed of a fastening component that is complementary to the first attachment 516 and/or the second attachment 517. The second lateral edge connector 514 may further be formed of a fastening component that is complementary to the third attachment 518 and/or the fourth attachment 519. For example, the first lateral edge connector 512 and/or the second lateral edge connector 514 may be formed of a loop material of a hook/loop fastener or connector. The attachments 516, 517, 518, and/or 519 may be formed of a hook material of a hook/loop fastener or connector. In some embodiments, the first lateral edge connector 512, the second lateral edge connector 514, and/or the attachments 516, 517, 518, and/or 519 may be formed of another suitable connector material (e.g., a hook fastener, a loop fastener, an adhesive, etc.). As will be discussed herein, the first lateral edge connector 512, the second lateral edge connector 514, and/or the attachments 516, 517, 518, and/or 519 may be configured to facilitate selectively coupling the roll strap 500 to itself (e.g., the first lateral edge connector 512 to the attachments 516 and/or 517, the second lateral edge connector 514 to the attachments 518 and/or 519, etc.), so as to stabilize and/or position a patient.

As shown in FIG. 5, the first lateral edge connector 512 and the second lateral edge connector 514 re located at a peripheral edge of the roll strap 500. For example, the first lateral edge connector 512 may be located proximate to the first lateral edge 508, and the second lateral edge connector 514 may be located proximate to the second lateral edge 510. According to some embodiments, the connectors (e.g., the first lateral edge connector 212, the second lateral edge connector 214) and the attachments (e.g., the attachments 516, 517, 518, and/or 519) are spaced a distance apart (e.g., 2 inches, 3 inches, 5 inches, 6 inches, 12 inches, etc.). In this regard, the positioning and spacing of the connectors (e.g., the first lateral edge connector 512, the second lateral edge connector 514, etc.) and counter-part attachments (e.g., the attachments 516, 517, 518, and/or 519), facilitate positioning of the roll strap 500 to engage one or more anchors or portions of the support structure (e.g., loop under a rail, a post, loop over a rail, a post, loop around a rail, a post, etc.) and couple the roll strap 500 to itself (e.g., as depicted in at least FIGS. 8-10).

As shown in FIG. 5, the roll strap 500 further includes at least one handle. For example, the roll strap 500 may include a first handle 530*a* positioned at the first connection end 526 and a second handle 530 positioned at the second connection end 528. The first handle 530*a* may be positioned opposite the first lateral edge connector 512 (e.g., on the top surface 524), and/or the second handle 530*b* may be positioned opposite the second lateral edge connector 514 (e.g., on the top surface 524). In some embodiments, the handles (e.g., the first handle 530*a*, the second handle 530*b*, etc.) are configured to be used to adjust the position of the roll strap 500 and/or a patient (e.g., positioned on or adjacent to the roll strap 500, etc.) by manipulating the roll strap 500. As described herein, the handles 530*a*, 530*b* may be formed of one or more strips of resilient material (e.g., nylon, etc.). The handles 530*a*, 530*b* may be spaced along one or more edges of the roll strap 500 (e.g., along the first lateral edge 508, the second lateral edge 510, etc.). In some embodiments, the roll strap 500 includes at least one handle that is positioned at another portion of the roll strap 500 (e.g., on the bottom surface 506, at another suitable edges, etc.) and/or is otherwise configured.

As described herein, in some embodiments the manipulation of the roll strap 500 (e.g., via the handles 530, etc.) and/or the engagement of components of the roll strap 500 (e.g., the first connection end 526, the second connection end 528, etc.) is/are configured to facilitate turning, positioning, and/or stabilizing a patient. For example, the first connection end 526 may be coupled with an anchor (e.g., via engagement of the first lateral edge connector 512 with the attachments 516 and/or 517, etc.) and used to support a patient in a lying position, and/or the second connection end 528 may be manipulated to couple with the anchor (e.g., via engagement of the second lateral edge connector 214 with the attachments 518 and/or 519) to position a patient in a side-lying position on one side of the body (as shown in at least FIGS. 6-7). In some embodiments, the first connection end 526 may be coupled with an anchor (e.g., via engagement of the first lateral edge connector 512 with the attachments 516 and/or 517, etc.) and used to support a back or torso of a patient, and the second connection end 528 may be manipulated to couple (e.g., via engagement of the second lateral edge connector 214 with the attachments 518 and/or 519) with another anchor (e.g., an opposite rail of a bed or support structure) to position a patient in an upright or seated position (as shown in at least FIG. 8). In some embodiments, the first connection end 526 may be coupled with an anchor (e.g., via engagement of the first lateral edge connector 512 with the attachments 516 and/or 517, etc.) to support an arm or a leg of a patient, and the second connection end 528 may be manipulated to couple (e.g., via engagement of the second lateral edge connector 214 with the attachments 518 and/or 519) with another anchor (e.g., an opposite rail of a bed or support structure) to position the arm or the leg of the patient in an elevated position (as shown in at least FIGS. 9-10).

In some embodiments, the roll strap 500 includes an attachment connection strip (not shown). For example, the roll strap 500 may include an attachment connection strip to removably couple another suitable system or device (e.g., a sheet, a pad, a mat, a handle, etc.). The attachment connection strip may be positioned along an edge of the roll strap 500. For example, the attachment connection strip may be positioned along the top edge 520. In some embodiments, the attachment connection strip is positioned along another suitable edge (e.g., the bottom edge 522, the first lateral edge 508, and/or the second lateral edge 510, etc.). The attachment connection strip may be positioned at the central portion 527, and/or the attachment connection strip may extend between the first connection end 526 and the second connection end 528 (e.g., across the central portion 527). In some embodiments, the roll strap 500 includes a plurality of attachment connection strips (e.g., two, three, four, five, ten, etc.). For example, the roll strap 500 may include a first attachment connection strip at the first connection end 526, a second attachment connection strip at the central portion 527, and/or a third attachment connection strip at the second connection end 528. As described herein, the attachment connection strip may be formed of a suitable fastening material, for example a hook fastener, a loop fastener, an adhesive, and/or another suitable fastening material configured to engage a counter-part fastening material on another suitable system or device (e.g., a sheet, a mat, a pad, a handle, etc.).

Referring generally to FIGS. 6-10, the roll strap 500 is shown during various processes, according to some embodiments. The processes generally described in FIGS. 6-10 may utilize components of the roll strap 500 (and/or the system 100), described herein.

Referring to FIGS. 6-7, the roll strap 500 is shown in use, according to some embodiments. With the roll strap 500 positioned on the support structure 102, a patient may be positioned on the roll strap 500 in a supine position (not shown). The first lateral edge 508 of the roll strap 500 may be positioned in a first direction toward an anchor (e.g., a portion of the support structure 102, the frame 105, or a portion thereof). For example, the first lateral edge 508 may be repositioned to loop around (e.g., under, over, around, etc.) an external rail (e.g., of the frame 105) of the support structure 102 (e.g., via manipulation of the handle 530*a*, etc.). With the first lateral edge 508 engaged with the frame 105, a connector (e.g., the first lateral edge connector 512) of the first lateral edge 508 may couple the roll strap 500 to the frame 105. For example, with the first lateral edge 508 engaged with the external rail of the frame 105 of the support structure 102 (e.g., looped around, etc.), the first lateral edge connector 512 may couple with the first attachment 516 and/or the second attachment 517 to couple the first connection end 526 to the external rail of the frame 105 (not shown).

In some embodiments, the second lateral edge 510 of the roll strap 500 may be repositioned, so as to provide supplemental support and/or to position the patient. For example, the second lateral edge 510 may be repositioned (e.g., manipulated, pulled, moved, etc.), so as to move the second lateral edge 510 toward an anchor (e.g., via manipulation of the handle 530*b*). In some embodiments, the second lateral edge 510 is repositioned in a second direction (e.g., away from the patient, in a direction substantially aligned with the first direction, in a direction substantially parallel with the first direction, etc.).

The second lateral edge 510 may also be repositioned, for example to engage an anchor (e.g., the frame 105, a railing of the frame 105, etc.). In some embodiments, the second lateral edge 510 is repositioned to loop around (e.g., loop under, loop over, etc.) an external member (e.g., rail, frame member, etc.) of the frame 105 (e.g., via manipulation of the handle 530*b*). The second lateral edge 510 may be repositioned to loop around the anchor engaged with the first lateral edge 508. With the second lateral edge 510 of the roll strap 500 engaged with the anchor, a connector (e.g., the second lateral edge connector 514, etc.) may couple the roll strap 500 to the anchor. For example, with the second lateral edge 510 engaged with the anchor (e.g., looped around the anchor or rail of the frame 105, etc.), the second lateral edge connector 514 may couple with the attachments 518, 519 to couple the second lateral edge 510 to the anchor. In this regard, the roll strap 500 (e.g., via components of the first connection end 526 and the second connection end 528, etc.) may couple an anchor (e.g., an external rail, post, or frame, etc.), so as to support or stabilize a patient. As shown in FIGS. 6-7, the roll strap 500 (e.g., via the central portion 527, etc.) may be configured to support or stabilize a portion of a patient (e.g., a shoulder, back, neck, etc.), for example to position or stabilize a patient in a side-lying or side-oriented position.

The processes described in FIGS. 6-7 can be completed in sequence, individually, in combination, and/or in reverse or another order with any of the other processes described herein.

Referring to FIG. 8, the roll strap 500 is shown in use, according to some embodiments, As discussed with regard to FIGS. 6-7, with the roll strap 500 positioned on the support structure 102, a patient may be positioned on the roll strap 500 in a supine position (not shown). The first lateral edge 508 of the roll strap 500 may be positioned in a first direction toward an anchor (e.g., a portion of the frame 105, the support structure 102, etc.). For example, the first lateral edge 508 may be repositioned to loop around (e.g., under, over, around, etc.) an external rail (e.g., of the frame 105), for example via manipulation of the handle 530*a*. With the first lateral edge 508 engaged with the frame 105, a connector (e.g., the first lateral edge connector 512) may couple the roll strap 500 to the frame 105. For example, with the first lateral edge 508 engaged with the external rail of the frame 105 (e.g., looped around, etc.), the first lateral edge connector 512 may couple with the first attachment 516 and/or the second attachment 517 to couple the first connection end 526 to the external rail of the frame 105 (as shown in at least FIG. 8).

In some embodiments, the second lateral edge 510 of the roll strap 500 may be repositioned, so as to provide supplemental support and/or to position the patient. For example, the second lateral edge 510 may be repositioned (e.g., manipulated, pulled, moved, etc.), so as to move the second lateral edge 510 toward an anchor, for example via manipulation of the handle 530*b*. In some embodiments, the second lateral edge 510 is repositioned in a second direction (e.g., away from the patient, in a direction substantially aligned with the first direction, in a direction substantially parallel with the first direction, etc.).

The second lateral edge 510 may also be repositioned, for example to engage an anchor (e.g., the frame 105, a railing of the frame 105, etc.). In some embodiments, the second lateral edge 510 is repositioned to loop around (e.g., loop under, loop over, etc.) an external member (e.g., rail, frame member, etc.) of the frame 105, for example via manipulation of the handle 530*b*. The second lateral edge 510 may be repositioned to loop around an anchor aside from the anchor engaged with the first connection end 526 (e.g., an opposing or opposite rail or post of the frame 105, etc.). With the second lateral edge 510 of the roll strap 500 engaged with the anchor, a connector (e.g., the second lateral edge connector 514, etc.) may couple the roll strap 500 to the anchor. For example, with the second lateral edge 510 engaged with the anchor (e.g., looped around the anchor or rail of the frame 105, etc.), the second lateral edge connector 514 may couple with the attachments 518, 519 to couple the second lateral edge 510 to the anchor. In this regard, the roll strap 500 (e.g., via components of the first connection end 526 and the second connection end 528, etc.) may couple a plurality of anchors (e.g., external rails or posts of a frame, etc.), so as to support or stabilize a patient. The roll strap 500 (e.g., via the central portion 527, etc.) may be configured to support or stabilize a portion of a patient (e.g., a torso, back, lower back, shoulders, etc.). As shown in FIG. 8, the roll strap 500 is utilized to position or stabilize a patient in an upright or sitting position.

The processes described in FIG. 8 can be completed in sequence, individually, in combination, and/or in reverse or another order with any of the other processes described herein.

Figure 9:
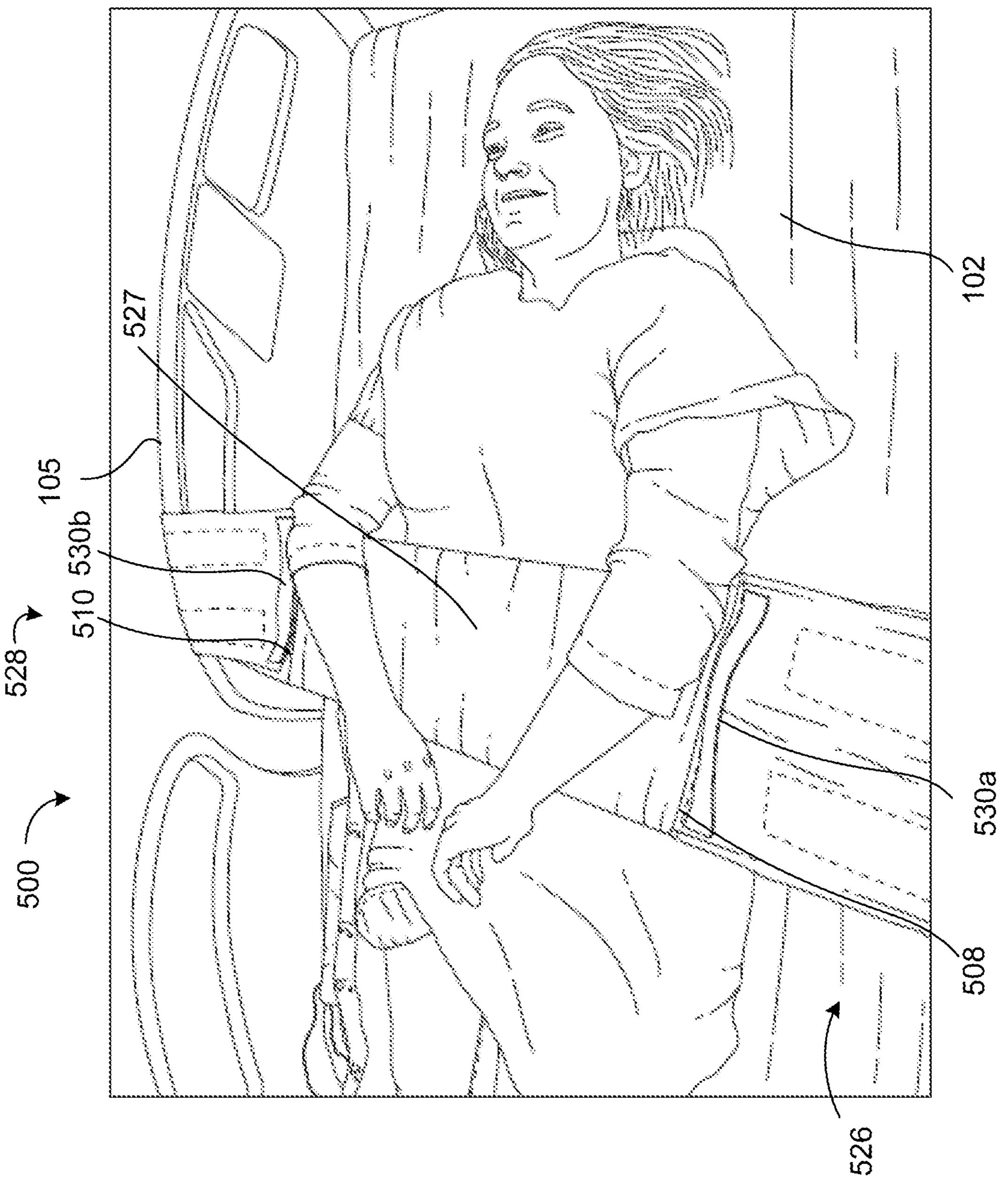
FIG. 9 is a top perspective view of the roll strap of FIG. 5 in use with a patient, according to an example embodiment.

Referring to FIG. 9, the roll strap 500 is shown in use, according to some embodiments, As shown in FIG. 9, a patient is positioned on the support structure 102, for example in a supine position. With the patient on the support structure 102, the roll strap 500 may be positioned atop (e.g., above, over, covering, etc.) the patient. The first lateral edge 508 of the roll strap 500 may be positioned in a first direction toward an anchor (e.g., a portion of the frame 105, the support structure 102, etc.). For example, the first lateral edge 508 may be repositioned to loop around (e.g., under, over, around, etc.) an external rail (e.g., of the frame 105), for example via manipulation of the handle 530*a*. With the first lateral edge 508 engaged with the frame 105, a connector (e.g., the first lateral edge connector 512) may couple the roll strap 500 to the frame 105. For example, with the first lateral edge 508 engaged with the external rail of the frame 105 (e.g., looped around, looped under, etc.), the first lateral edge connector 512 may couple with the first attachment 516 and/or the second attachment 517 to couple the first connection end 526 to the external rail of the frame 105 (as shown in at least FIG. 9).

In some embodiments, the second lateral edge 510 of the roll strap 500 may be repositioned, so as to provide supplemental support and/or to position the patient. For example, the second lateral edge 510 may be repositioned (e.g., manipulated, pulled, moved, etc.), so as to move the second lateral edge 510 toward an anchor, for example via manipulation of the handle 530*b*. In some embodiments, the second lateral edge 510 is repositioned in a second direction (e.g., away from the patient, in a direction opposite the first direction, in a direction substantially parallel with the first direction, etc.).

The second lateral edge 510 may also be repositioned, for example to engage an anchor (e.g., the frame 105, a railing of the frame 105, etc.). In some embodiments, the second lateral edge 510 is repositioned to loop around (e.g., loop under, loop over, etc.) an external member (e.g., rail, frame member, etc.) of the frame 105, for example via manipulation of the handle 530*b*. As shown in FIG. 9, the second lateral edge 510 may be repositioned to loop around an anchor aside from the anchor engaged with the first connection end 526 (e.g., an opposing or opposite rail or post of the frame 105, etc.). With the second lateral edge 510 of the roll strap 500 engaged with the anchor, a connector (e.g., the second lateral edge connector 514, etc.) may couple the roll strap 500 to the anchor. For example, with the second lateral edge 510 engaged with the anchor (e.g., looped around the anchor or rail of the frame 105, etc.), the second lateral edge connector 514 may couple with the attachments 518, 519 to couple the second lateral edge 510 to the anchor. In this regard, the roll strap 500 (e.g., via components of the first connection end 526 and the second connection end 528, etc.) may couple a plurality of anchors (e.g., externals rail or posts of a frame, etc.), so as to support or stabilize a patient. As shown in FIG. 9, the roll strap 500 (e.g., via the central portion 527, etc.) is configured to support or stabilize a portion of a patient (e.g., an arm, a forearm, hands, upper arms, shoulders, etc., etc.), for example to position or stabilize the portion of the patient in an elevated and/or upright position.

The processes described in FIG. 9 can be completed in sequence, individually, in combination, and/or in reverse or another order with any of the other processes described herein.

Figure 10:
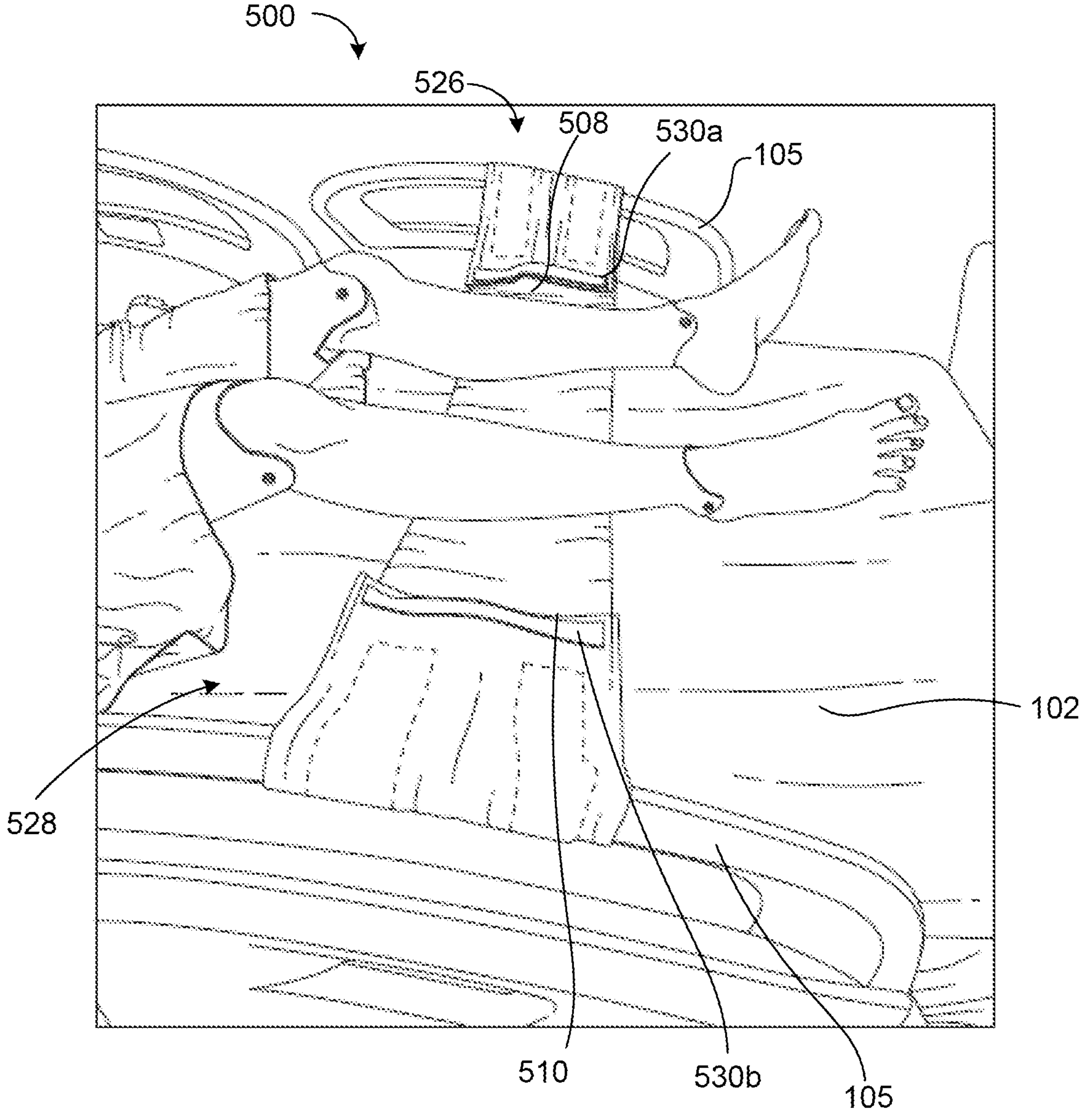
FIG. 10 is a top perspective view of the roll strap of FIG. 5 in use with a patient, according to an example embodiment.

Referring to FIG. 10, the roll strap 500 is shown in use, according to some embodiments, As discussed with regard to FIGS. 6-8, with the roll strap 500 positioned on the support structure 102, a patient may be positioned on the roll strap 500 in a supine position. A portion of the patient's anatomy may be positioned over on the roll strap 500, for example a patient's leg (e.g., upper leg, lower leg, ankle, foot, etc.). The first lateral edge 508 of the roll strap 500 may be positioned in a first direction toward an anchor (e.g., a portion of the frame 105, the support structure 102, etc.). For example, the first lateral edge 508 may be repositioned to loop around (e.g., under, over, around, etc.) an external rail (e.g., of the frame 105), for example via manipulation of the handle 530*a*. With the first lateral edge 508 engaged with the frame 105, a connector (e.g., the first lateral edge connector 512) may couple the roll strap 500 to the frame 105. For example, with the first lateral edge 508 engaged with the external rail of the frame 105 (e.g., looped around, etc.), the first lateral edge connector 512 may couple with the first attachment 516 and/or the second attachment 517 to couple the first connection end 526 to the external rail of the frame 105 (as shown in at least FIG. 10).

In some embodiments, the second lateral edge 510 of the roll strap 500 may be repositioned, so as to provide supplemental support and/or to position the patient. For example, the second lateral edge 510 may be repositioned (e.g., manipulated, pulled, moved, etc.), so as to move the second lateral edge 510 toward an anchor, for example via manipulation of the handle 530*b*. In some embodiments, the second lateral edge 510 is repositioned in a second direction (e.g., away from the patient, in a direction opposite the first direction, in a direction substantially parallel with the first direction, etc.).

The second lateral edge 510 may also be repositioned, for example to engage an anchor (e.g., the frame 105, a railing of the frame 105, etc.). In some embodiments, the second lateral edge 510 is repositioned to loop around (e.g., loop under, loop over, etc.) an external member (e.g., rail, frame member, etc.) of the frame 105, for example via manipulation of the handle 530*b*. The second lateral edge 510 may be repositioned to loop around an anchor aside from the anchor engaged with the first connection end 526 (e.g., an opposing or opposite rail or post of the frame 105, etc.). With the second lateral edge 510 of the roll strap 500 engaged with the anchor, a connector (e.g., the second lateral edge connector 514, etc.) may couple the roll strap 500 to the anchor. For example, with the second lateral edge 510 engaged with the anchor (e.g., looped around the anchor or rail of the frame 105, etc.), the second lateral edge connector 514 may couple with the attachments 518, 519 to couple the second lateral edge 510 to the anchor. In this regard, the roll strap 500 (e.g., via components of the first connection end 526 and the second connection end 528, etc.) may couple a plurality of anchors (e.g., external rails or posts of a frame, etc.), so as to support or stabilize a patient. As shown in FIG. 10, the roll strap 500 (e.g., via the central portion 527, etc.) may be configured to support or stabilize a portion of a patient (e.g., a leg, an upper leg, a lower leg, an ankle, a foot, etc.), for example to position or stabilize the portion of the patient in an elevated and/or upright position.

The processes described in FIG. 10 can be completed in sequence, individually, in combination, and/or in reverse or another order with any of the other processes described herein.

As described herein, all or some of the components described herein may be provided as a kit. For example, the kit (not shown) may be pre-packaged to include all necessary components of the system 100 and/or the roll strap 500.

According to some embodiments, the kit includes a sheet (e.g., the sheet 104) and an absorbent pad (e.g., the absorbent pad 132). In some embodiments, the kit includes a roll strap (e.g., the roll strap 122, the roll strap 500, etc.). The roll strap may be separate from the sheet and/or the absorbent pad. In some embodiments, the roll strap is coupled with the sheet, for example such that the roll strap does not contact the absorbent pad. Furthermore, the roll strap (e.g., the roll strap 500) may be used to secure the sheet (e.g., a folded sheet 104) and the absorbent pad (e.g., the absorbent pad 132), such that they do not come unfolded when unpacking the kit. For example, the roll strap 500 may be wrapped around the sheet 104. The first lateral edge 508 or the second lateral edge 510 may be secured to the roll strap 500 to prevent the sheet 104 from unfolding.

As utilized herein with respect to numerical ranges, the terms “approximately,” “about,” “substantially,” and similar terms generally mean+/−10% of the disclosed values, unless specified otherwise. As utilized herein with respect to structural features (e.g., to describe shape, size, orientation, direction, relative position, etc.), the terms “approximately,” “about,” “substantially,” and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term “example”, “exemplary,” “some”, and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term “coupled” and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If “coupled” or variations thereof are modified by an additional term (e.g., directly coupled), the generic definition of “coupled” provided above is modified by the plain language meaning of the additional term (e.g., “directly coupled” means the joining of two members without any separate intervening member), resulting in a narrower definition than the generic definition of “coupled” provided above. Such coupling may be mechanical, electrical, or fluidic.

References herein to the positions of elements (e.g., “top,” “bottom,” “above,” “below”) are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. For example, the roll strap 500 of the exemplary embodiments described in at least FIGS. 5-10 may be incorporated in the system 100 of the exemplary embodiment described in at least FIGS. 1-4. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A system for positioning a patient on a support structure having a support surface, the system comprising:
- a sheet configured to be positioned on the support surface, the sheet comprising a receiving connection strip; and
- a roll strap comprising:
  - a top edge,
  - a bottom edge,
  - a first lateral edge connector, and
  - a first connection end comprising a first lateral edge attachment, the first connection end configured to engage with a portion of the support structure to maintain the patient positioned on the sheet and the roll strap in an angled position relative to the support surface;
- wherein at least one of the top edge or the bottom edge of the roll strap comprises an attachment connection strip configured to removably couple with the receiving connection strip, and
- wherein a position of the attachment connection strip and a position of the first lateral edge attachment are selected to enable the first lateral edge connector to engage with the attachment connection strip and the first lateral edge attachment while the attachment connection strip engages with the receiving connection strip.

2. The system of claim 1, wherein the first lateral edge connector and the first lateral edge attachment are located on a first surface of the roll strap.

3. The system of claim 1, wherein:
- the first connection end is configured to engage with the portion of the support surface by wrapping the first connection end around the portion of the support surface; and
- the patient is maintained in the angled position by removably coupling the first lateral edge connector with the first lateral edge attachment.

4. The system of claim 1, further comprising:
- a second lateral edge connector, and
- a second connection end comprising a second end attachment, the second connection end positioned opposite of the first connection end.

5. The system of claim 1, wherein the first lateral edge connector comprises a hook fastening material or a loop fastening material, and the first lateral edge attachment comprises the other of the hook fastening material or the loop fastening material.

6. The system of claim 1, wherein the receiving connection strip is formed as a first elongated strip and the attachment connection strip is formed as a second elongated strip.

7. The system of claim 1, wherein the receiving connection strip comprises a hook fastening material or a loop fastening material and the attachment connection strip comprises the other of the hook fastening material or the loop fastening material.

8. The system of claim 1, wherein the receiving connection strip is positioned at an edge of the sheet.

9. A roll strap for positioning a patient on a support structure having a support surface, the roll strap comprising:
- an elongated sheet of material configured to be positioned under a portion of the patient;

an attachment connection strip;

a first lateral edge connector; and a first connection end comprising a first lateral edge attachment, the first connection end configured to engage with a portion of the support structure to maintain the patient in an angled position relative to the support surface, wherein a position of the attachment connection strip and a position of the first lateral edge attachment are selected to enable the first lateral edge connector to engage with the attachment connection strip and the first lateral edge attachment while the attachment connection strip engages with a complementary connection strip of a sheet configured to be positioned on the support surface.

10. The roll strap of claim 9, wherein:

the first connection end is configured to engage with the portion of the support surface by wrapping the first connection end around the portion of the support surface; and the patient is maintained in the angled position by removably coupling the first lateral edge connector with the first lateral edge attachment.

11. The roll strap of claim 9, further comprising:

a second lateral edge connector; and a second connection end comprising a second end attachment.

12. The roll strap of claim 9, wherein the first lateral edge connector comprises a hook fastening material or a loop fastening material, and the first lateral edge attachment comprises the other of the hook fastening material or the loop fastening material.

13. The roll strap of claim 9, further comprising a top edge and a bottom edge, wherein at least one of the top edge or the bottom edge comprises the attachment connection strip, the attachment connection strip configured to removably couple with the complementary connection strip.

14. The roll strap of claim 13, wherein the attachment connection strip is formed as a first elongated strip and the complementary connection strip is formed as a second elongated strip.

15. The roll strap of claim 13, wherein the attachment connection strip comprises a hook fastening material or a loop fastening material, and the complementary connection strip comprises the other of the hook fastening material or the loop fastening material.

16. A method for positioning a patient on a support structure having a support surface, the method comprising:

placing a sheet on the support structure under the patient, the sheet comprising a receiving connection strip;

fastening a roll strap to the sheet by engaging an attachment connection strip of the roll strap to the receiving connection strip;

pulling a first connection end of the roll strap in a direction towards an opposing side of the support structure, moving the patient from a first position to an angled position relative to the support surface, the first connection end comprising a first lateral edge attachment;

engaging the first connection end with a portion of the support structure; and engaging a first lateral edge connector of the roll strap with the attachment connection strip and the first lateral edge attachment while the attachment connection strip engages with the receiving connection strip to maintain the patient positioned on the sheet and the roll strap in the angled position.

17. The method of claim 16, wherein:

engaging the first connection end with the portion of the support structure comprises wrapping the first connection end around the portion of the support surface, and engaging the first lateral edge connector with the attachment connection strip and the first lateral edge attachment comprises removably coupling the first lateral edge connector with the attachment connection strip and the first lateral edge attachment.

18. The method of claim 16, further comprising removing the sheet from the roll strap to access a portion of a back of the patient.

* * * * *